(12) United States Patent
Kawai

(10) Patent No.: US 7,464,215 B2
(45) Date of Patent: Dec. 9, 2008

(54) CRADLE DEVICE, CONTROL METHOD AND COMPUTER PROGRAM FOR CONTROLLING THE ATTITUDE OF AN IMAGING DEVICE

(75) Inventor: Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 11/444,831

(22) Filed: May 31, 2006

(65) Prior Publication Data

US 2006/0279253 A1 Dec. 14, 2006

(30) Foreign Application Priority Data

Jun. 8, 2005 (JP) ............... 2005-168205

(51) Int. Cl.
*G06F 13/00* (2006.01)
*H04N 7/18* (2006.01)

(52) U.S. Cl. ............. 710/303; 348/207.11; 348/211.99; 352/178; 352/179; 396/58; 399/8

(58) Field of Classification Search ............ 710/1, 710/17, 303, 304; 711/100; 345/418, 168, 345/204; 361/600, 614, 686; 399/8; 382/100, 382/232; 356/601; 396/297, 388, 58; 713/300; 352/178, 179; 348/14.05, 207.1, 207.11, 348/211.99, 211.4, 211.7, 211.9
See application file for complete search history.

(56) References Cited

U.S. PATENT DOCUMENTS

| | | | | |
|---|---|---|---|---|
| 4,835,530 A | * | 5/1989 | Morita et al. | ................ 345/204 |
| 5,068,735 A | * | 11/1991 | Tuchiya et al. | ........... 348/211.9 |
| 5,223,878 A | * | 6/1993 | Shintani et al. | ................ 396/58 |
| 5,463,436 A | * | 10/1995 | Shintani et al. | ................ 396/58 |
| 6,067,571 A | | 5/2000 | Igarashi et al. | |
| 6,067,624 A | | 5/2000 | Kuno | |
| 6,484,195 B1 | | 11/2002 | Igarashi et al. | |
| 6,992,784 B1 | * | 1/2006 | Kohtani et al. | ............. 358/1.15 |
| 7,063,214 B2 | * | 6/2006 | Schulte et al. | ............... 209/405 |
| 7,167,206 B2 | * | 1/2007 | Kayanuma | .................. 348/375 |
| 7,177,552 B2 | * | 2/2007 | Koike | .......................... 399/12 |
| 7,253,840 B2 | * | 8/2007 | Kayanuma | .................. 348/375 |
| 7,280,797 B2 | * | 10/2007 | Moriyama | .................. 399/382 |

(Continued)

FOREIGN PATENT DOCUMENTS

JP 10-40185 A 2/1998

(Continued)

OTHER PUBLICATIONS

"Experimental evaluation of augmented reality in object assembly task" by Tang et al. (abstract only) Publication Date: Sep. 30 Oct. 1, 2002.*

*Primary Examiner*—Glenn A Auve
(74) *Attorney, Agent, or Firm*—Canon U.S.A., Inc., IP Division

(57) ABSTRACT

At least one exemplary embodiment is directed to a cradle device which inhibits driving of a pan/tile driving unit in the event of an imaging device being detached from the cradle device, and also receiving a control command of the imaging device from a camera. The cradle device can lock the imaging device in the event that the imaging device is mounted on the cradle device. The cradle device can have a configuration enabling detaching the imaging device, thus facilitating the most appropriate environment for a surveillance system.

13 Claims, 21 Drawing Sheets

U.S. PATENT DOCUMENTS

| | | | |
|---|---|---|---|
| 2002/0196360 A1* | 12/2002 | Miyadera | 348/373 |
| 2003/0193588 A1* | 10/2003 | Yuen et al. | 348/275 |
| 2004/0004671 A1* | 1/2004 | Takahashi | 348/375 |
| 2004/0008465 A1* | 1/2004 | Chu et al. | 361/103 |
| 2004/0075653 A1* | 4/2004 | Shiuan et al. | 345/204 |
| 2004/0233282 A1* | 11/2004 | Stavely et al. | 348/143 |
| 2005/0162508 A1* | 7/2005 | Basmadjian et al. | 348/14.01 |
| 2005/0163387 A1* | 7/2005 | Sugita | 382/232 |
| 2005/0225666 A1* | 10/2005 | Katakai | 348/373 |
| 2006/0023069 A1* | 2/2006 | Saito | 348/207.99 |
| 2006/0253638 A1* | 11/2006 | Oliver et al. | 710/303 |
| 2006/0285756 A1* | 12/2006 | Sugita | 382/232 |
| 2007/0047827 A1* | 3/2007 | Sugita | 382/232 |

FOREIGN PATENT DOCUMENTS

| | | |
|---|---|---|
| JP | 10-42278 A | 2/1998 |
| JP | 2002-199251 A | 7/2002 |

* cited by examiner

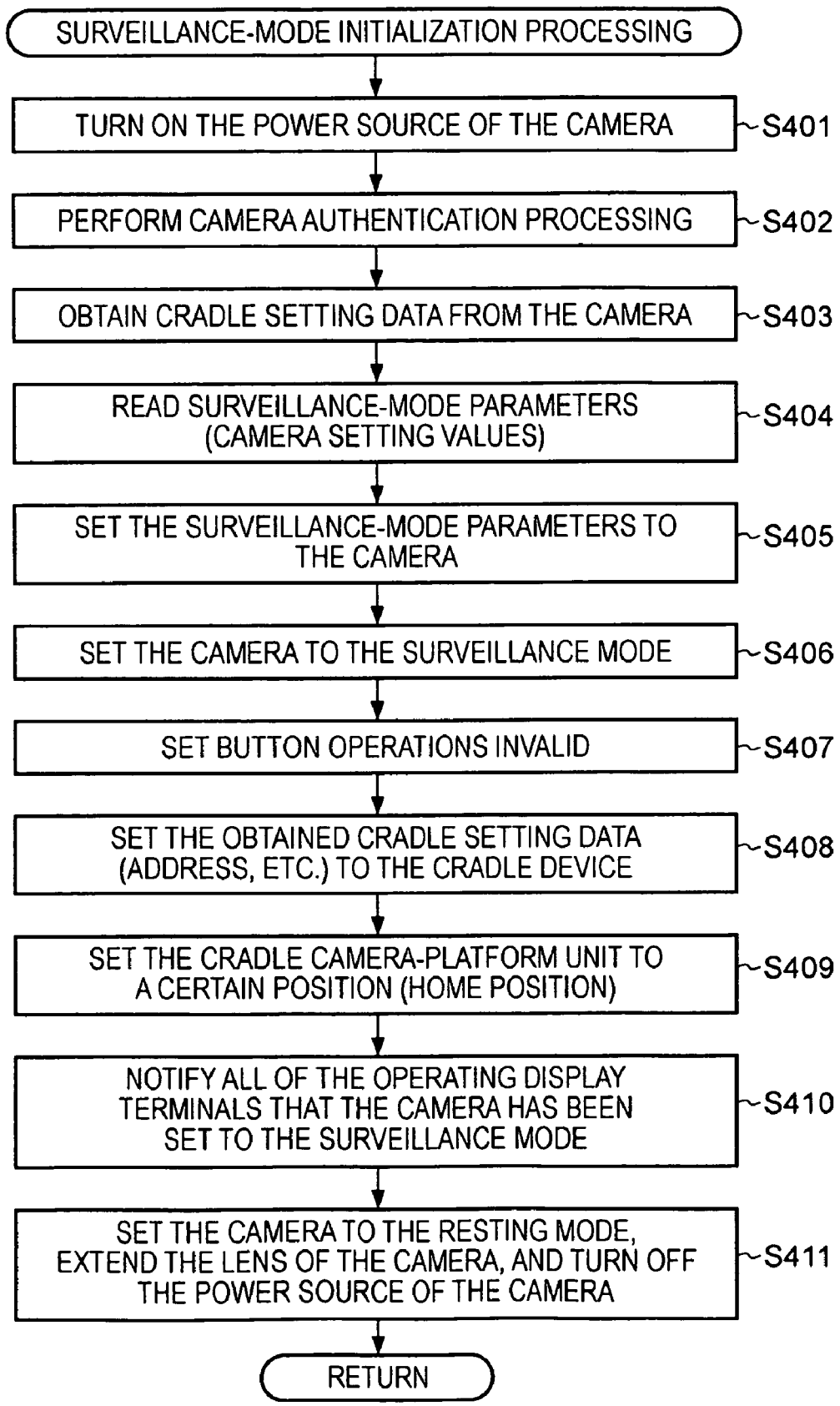

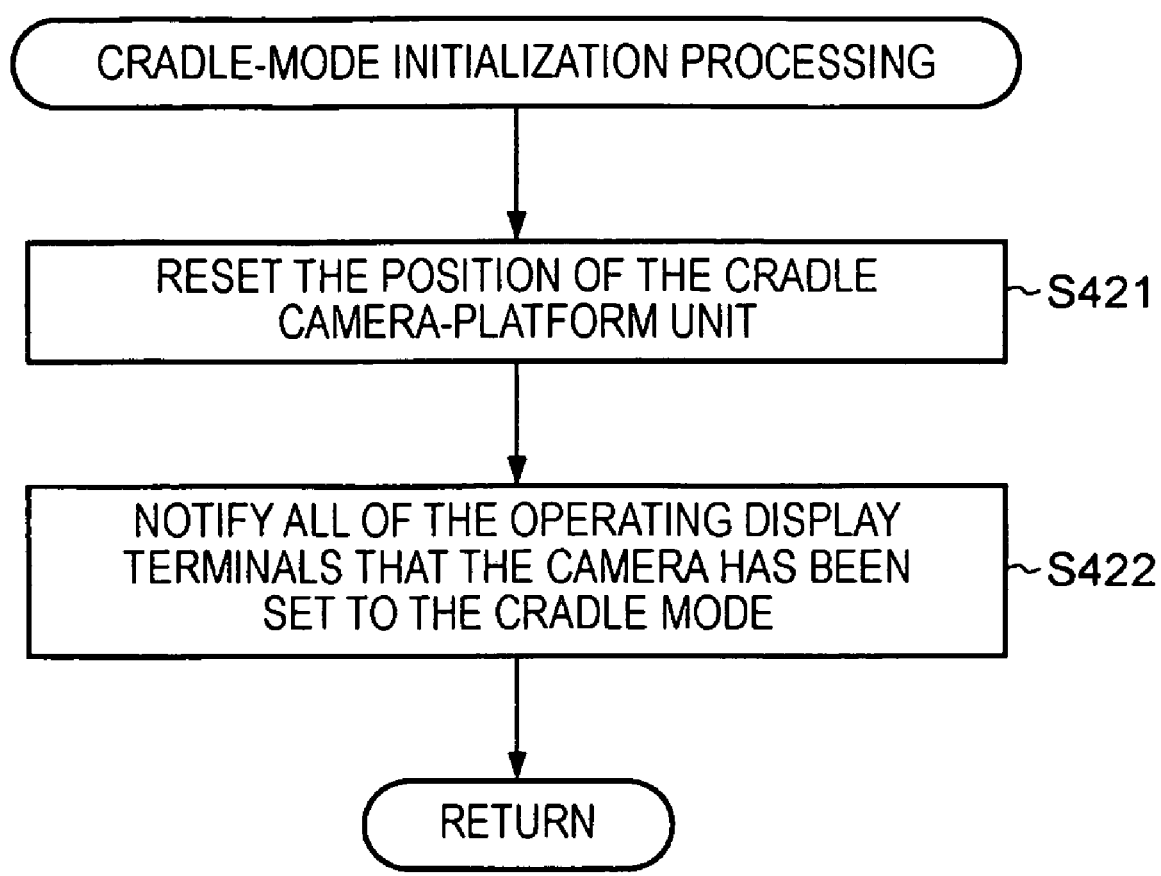

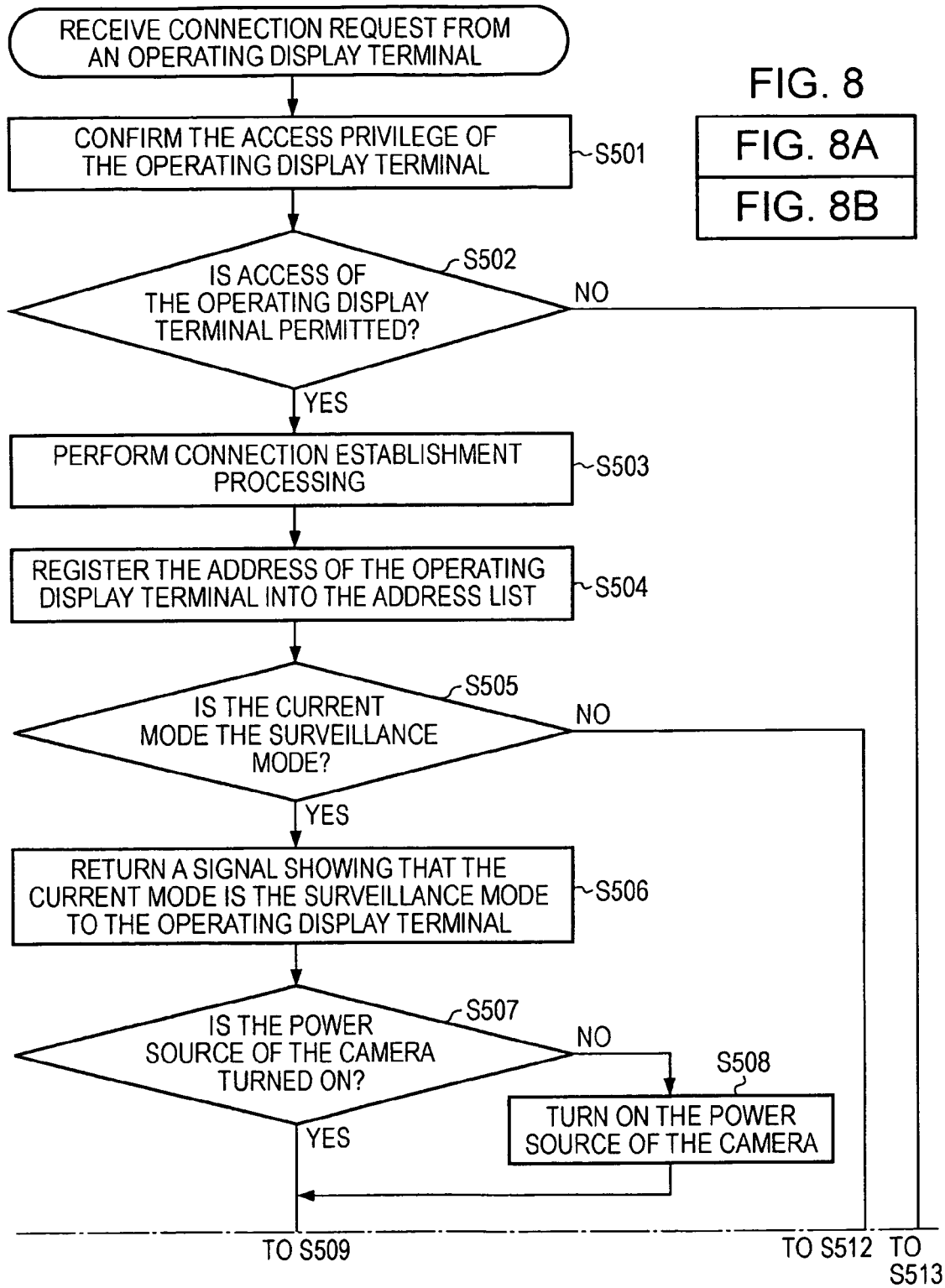

FIG. 16

| ID | Request | | | | | | | |
|---|---|---|---|---|---|---|---|---|
| C101 | CONNECTION REQUEST | ADDRESS | PASSWORD | | | | | |
| C102 | DISCONNECTION REQUEST | ADDRESS | PASSWORD | | | | | |
| C201 | CONTROL RIGHT REQUEST | ADDRESS | PASSWORD | | | | | |
| C202 | CONTROL RIGHT RELEASE REQUEST | ADDRESS | PASSWORD | | | | | |
| C211 | RELEASE REQUEST | ADDRESS | PASSWORD | | | | | |
| C212 | RELEASE HALF-PRESS REQUEST | ADDRESS | PASSWORD | ON/OFF | | | | |
| C213 | PT CONTROL REQUEST | ADDRESS | PASSWORD | PAN ANGLE | TILT ANGLE | | | |
| C214 | ZOOM CONTROL REQUEST | ADDRESS | PASSWORD | ZOOM VALUE | | | | |
| C216 | EXPOSURE SETTING REQUEST | ADDRESS | PASSWORD | AE/ME SETTING | ME EXPOSURE VALUE | EXPOSURE CORRECTION VALUE | | |
| C217 | DISTANCE MEASURING POINT SELECTION REQUEST | ADDRESS | PASSWORD | AUTOMATIC /MANUAL | MANUAL SELECTED POSITION | | | |
| C218 | FOCUS SETTING REQUEST | ADDRESS | PASSWORD | AUTOMATIC /MANUAL | MF FOCAL POSITION | | | |
| C301 | THUMBNAIL OBTAINING REQUEST | ADDRESS | PASSWORD | NUMBER OF IMAGES | IMAGE ID/ THUMBNAIL LIST | | | |
| C302 | IMAGE OBTAINING REQUEST | ADDRESS | PASSWORD | IMAGE ID LIST | | | | |
| C304 | IMAGE COPYING REQUEST | ADDRESS | PASSWORD | COPYING DIRECTION | IMAGE ID | | | |
| C401 | IMAGE-SIZE SETTING REQUEST | ADDRESS | PASSWORD | IMAGE RESOLUTION | | | | |
| C405 | LOW-SPEED SHUTTER SETTING REQUEST | ADDRESS | PASSWORD | SHUTTER SPEED | | | | |
| C603 | ACCESS PERMISSION ADDRESS | ADDRESS | PASSWORD | COMMAND CATEGORY | ADDRESS LIST | ... | COMMAND CATEGORY | ADDRESS LIST |

CRADLE DEVICE, CONTROL METHOD AND COMPUTER PROGRAM FOR CONTROLLING THE ATTITUDE OF AN IMAGING DEVICE

BACKGROUND OF THE INVENTION

1. Field of the Invention

The present invention relates to a cradle device, a control method of an image sensing system, and a computer program. In particular, though not exclusively, at least one exemplary embodiment is directed towards operating a cradle device configured to control the attitude of an imaging device.

2. Description of the Related Art

Network cameras have been being studied to aid in the prevention of many problems, such as crime prevention, however there also exists a potential demand for various other unprecedented usage of cameras.

For example, so-called network cameras for viewing the images of a remote place have been increasing in number in the midst of the spread of network environment due to increased communication speeds, of which the Internet is a typical example.

Specifically, for example, systems where the images of a camera disposed in a remote place can be observed by multiple people via a network. Additionally, a system which not only can observe the images of a camera but also can operate the pan/tilt angle and zoom scale factor of a camera by remote control, is available. This system can distribute both moving images and still images via a network.

Also, when a great number of people control one camera, who takes charge of control of the camera presents a problem. Regarding such a problem, a technique which allows only those who have a camera control right to control a camera has been discussed. With such a camera, various usages from novelty usage to surveillance usage are conceivable.

Also, as the spread of digital cameras have increased, various unprecedented usages have also been studied regarding digital cameras. For example, there is a camera platform for a digital camera in which a pan/tilt function is provided.

However, none of the above techniques consider the processing of a cradle device when being operated as a surveillance camera from a remote place, with a digital camera mounted on the cradle device, while maintaining normal usage as a digital camera.

For example, these do not take into consideration what happens when someone detaches a digital camera while accessing the digital camera which operates as a surveillance camera via a network, or when the digital camera has not been mounted on the cradle device at the time of accessing the digital camera via a network.

Also, heretofore, little consideration has been given to a setting method of a cradle device for a digital camera itself, which can be accessed via a network, and also can perform pan/tilt operation. For example, heretofore, setting of a network, presetting of PTZ (Pan-Tilt-Zoom) have been little considered if at all.

SUMMARY OF THE INVENTION

At least one exemplary embodiment is directed toward the operation of a cradle device, which can have a detachable configuration for an imaging device (e.g., digital camera, video recorder).

At least one exemplary embodiment is directed to a cradle device which comprises: a mounting unit for mounting an imaging device; a mounting determining device configured for determining whether or not the imaging device is mounted on the mounting unit; and a control device configured for controlling the attitude of the imaging device; where the control device controls the attitude of the imaging device mounted on the mounting unit by driving the mounting unit based on an instruction from an external device in the event that the mounting determining device determines that the imaging device is mounted on the mounting unit, and the control device inhibits control of the attitude of the imaging device by driving the mounting unit in the event that the mounting determining device determines that the imaging device is not mounted on the mounting unit.

Further features of the present invention will become apparent from the following description of exemplary embodiments with reference to the attached drawings.

BRIEF DESCRIPTION OF THE DRAWINGS

FIG. 6 illustrates an exemplary embodiment of the present invention, and is a flowchart for describing one example of surveillance-mode initialization processing.

FIG. 7 illustrates an exemplary embodiment of the present invention, and is a flowchart for describing one example of cradle-mode initialization processing.

FIG. 16 illustrates an exemplary embodiment of the present invention, and is a diagram listing an example a part of the packet data format of a command.

DESCRIPTION OF THE EMBODIMENTS

Figure 1:
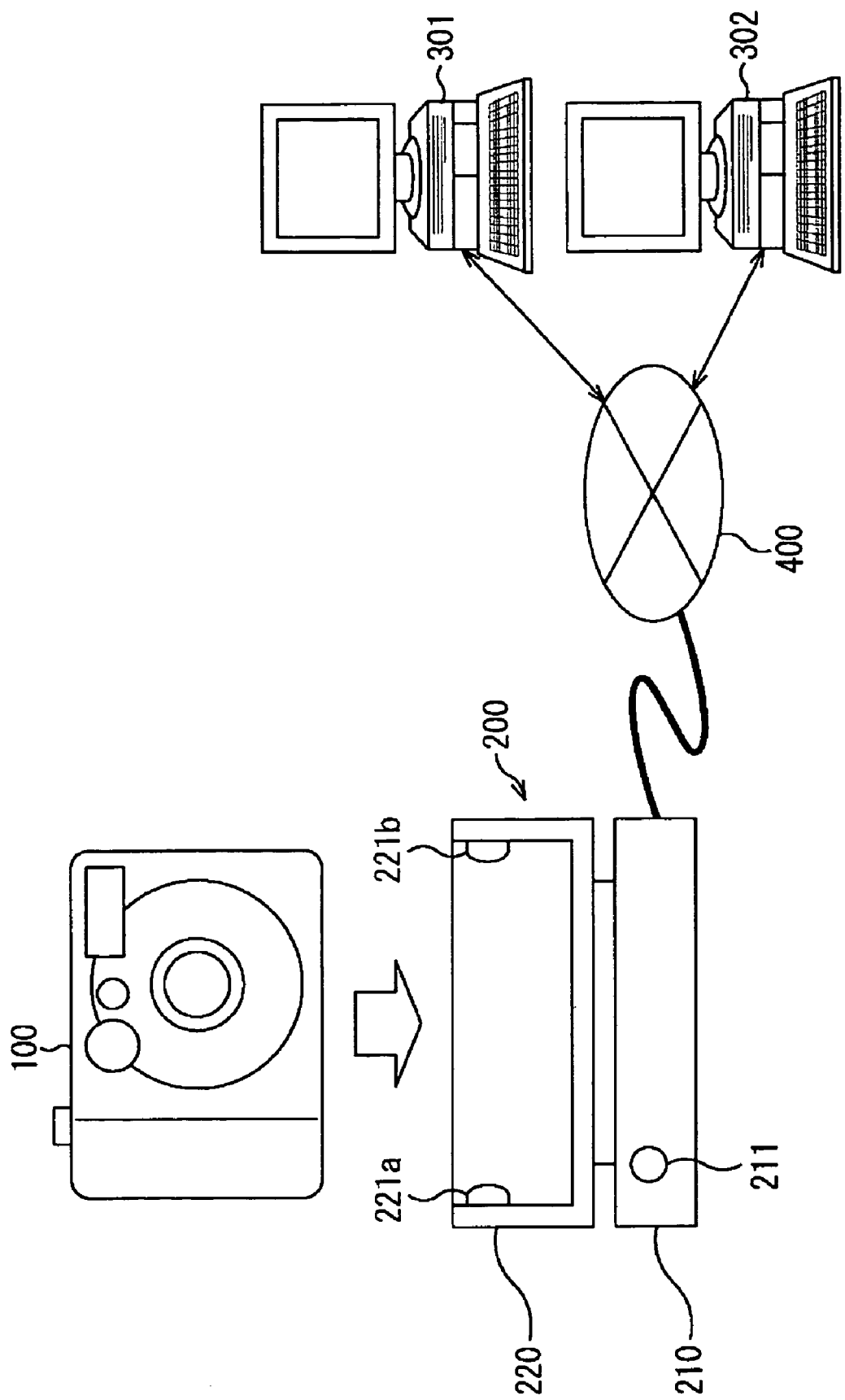
FIG. 1 illustrates an exemplary embodiment of the present invention, and is a diagram illustrating one example of the overall configuration of a network camera system.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the software programming of GUI display systems.

In all of the examples illustrated and discussed herein any specific values, for example the position of the cradle, should be interpreted to be illustrative only and non limiting. Thus, other examples of the exemplary embodiments could have different values. For example although digital cameras are used as an example of imaging devices in the illustrated examples, exemplary embodiments are not limited to digital cameras, any imaging device can be used (e.g., video recorder).

Notice that similar reference numerals and letters refer to similar items in the following figures, and thus once an item is defined in one figure, it may not be discussed for following figures.

Hereinafter, at least one exemplary embodiment will be described. FIG. 1 is a diagram illustrating one example of the overall configuration of a network camera system according to the present exemplary embodiment.

The network camera system in FIG. 1 comprises a digital camera 100 serving as an imaging device, and a cradle device 200 serving as an expansion device. The cradle device 200 comprises a cradle main unit 210, and a cradle camera-platform unit 220. The cradle device 200 can be employed, for example, for controlling the attitude of the digital camera 100, and includes a camera-platform function which can control panning/tilting, and a network function. With the network system according to the present exemplary embodiment, the cradle device 200 realizes control of zoom, focal point, exposure, of the digital camera 100 according to instructions from remote locations, and takes still images and moving images with the digital camera 100.

The cradle camera-platform unit 220 has a configuration enabling mounting and detaching the digital camera 100, and can control the pan angle and the tilt angle of the mounted digital camera 100 using a mechanism such as a motor. Further, upon the digital camera 100 being mounted on the cradle camera-platform unit 220, the digital camera 100 and the cradle main unit 210 can be electrically connected.

Also, the cradle camera-platform unit 220 includes locking mechanisms 221a and 221b for mechanically locking between the cradle camera-platform unit 220 and the digital camera 100 so that the digital camera 100 can not be detached easily from the cradle camera-platform unit 220. The digital camera can be detached using a control based on a later-described command. The cradle main unit 210, in response to the operating instruction from multiple operating display terminals 301 and 302, transmits the real time images being captured by the digital camera 100 via a network 400 such as a LAN or the Internet. Also, the cradle main unit 210, in response to the operating instruction from the multiple operating display terminals 301 and 302, can change the image-capturing direction of the digital camera 100 by controlling the cradle camera-platform unit 220.

Further, the cradle main unit 210 includes comparatively high-capacity memory which can accumulate the images photographed by the digital camera 100. Also, the cradle main unit 210 includes a sensor 211 such as a human detection sensor (e.g., infrared detector). The cradle main unit 210 can control activation of the power source of the digital camera 100 based on the detection signal in the sensor 211.

Figure 2:
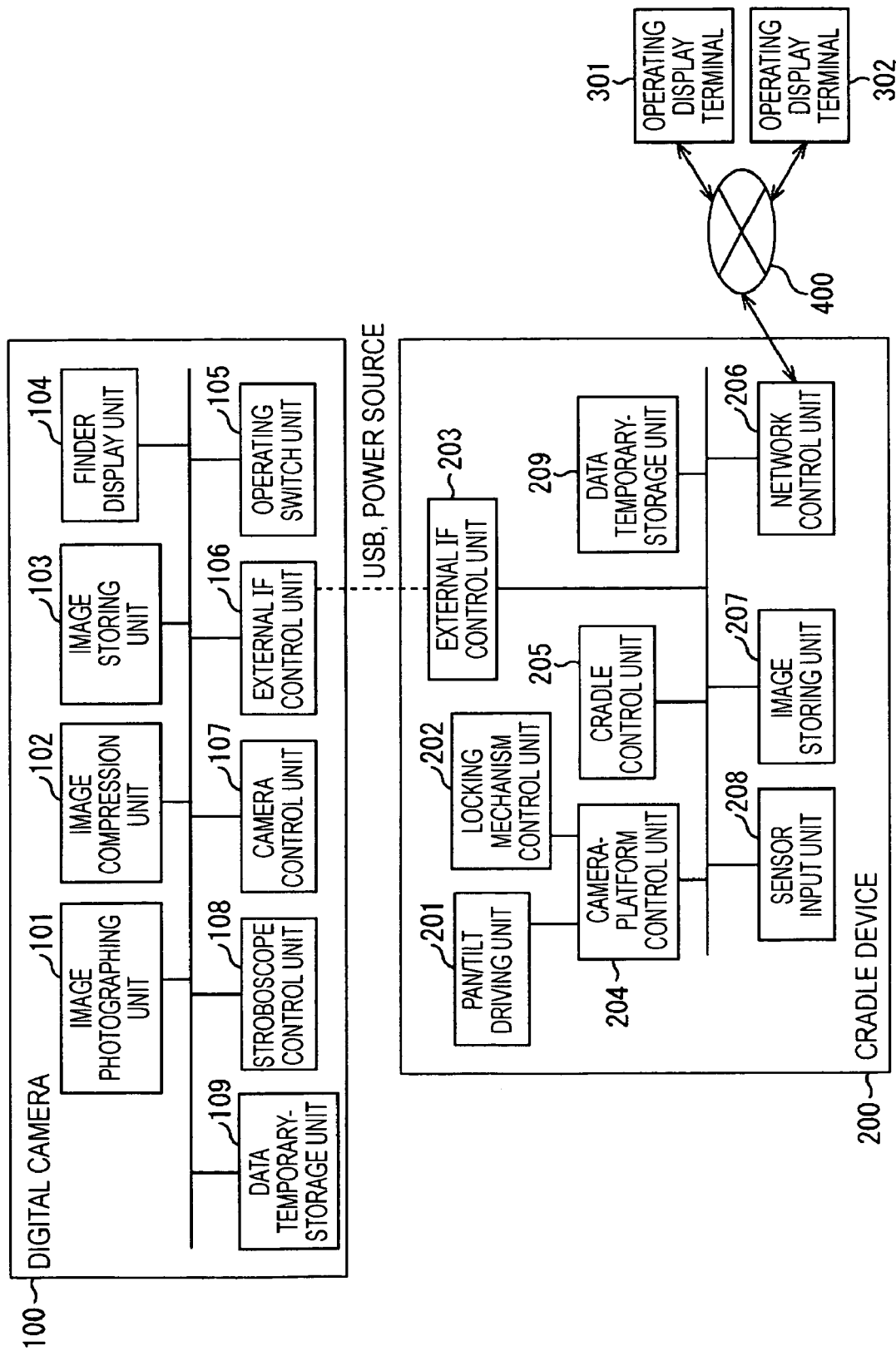
FIG. 2 illustrates an exemplary embodiment of the present invention, and is a functional block diagram illustrating one example of the configurations of a digital camera and a cradle device.

FIG. 2 is a functional block diagram illustrating one example of the configurations of the digital camera 100 and cradle device 200 according to the present exemplary embodiment.

In FIG. 2, the cradle camera-platform unit 220 shown in FIG. 1 includes a pan/tilt driving unit 201, a locking mechanism control unit 202, and an external IF control unit 203.

The digital camera 100 comprises an image photographing unit 101, an image compression unit 102, an image storing unit 103, a viewfinder display unit 104, an operating switch unit 105, an external IF control unit 106, a camera control unit 107, and a stroboscope control unit 108. The digital camera 100 is assumed to include these so-called basic functions as a digital camera.

The image photographing unit 101 comprises an imaging device such as a CCD (Charge Coupled Device) or a CMOS for converting the light image formed on the imaging surface via a lens into analog image data, and a video signal processing circuit for converting the converted analog image data into digital image data. The image compression unit 102 compresses the digital image data output from the image photographing unit 101 using JPEG or other related or equivalent formats as known by one of ordinary skill in the relevant art for still images, and using Motion JPEG, MPEG4, or other related or equivalent formats as known by one of ordinary skill in the relevant art for moving images. The compressed image data can be recorded in the image storing unit 103 as a file. The viewfinder display unit 104 displays the images photographed by the image photographing unit 101, and the other operating GUIs (Graphic User Interfaces). Settings and modifications of release, and image quality are performed with the operating switch unit 105.

Also, the network camera system according to the present exemplary embodiment can be configured so as to set a field angle while viewing an image instead of an optical viewfinder. The external IF control unit 106 is a portion for enabling a control signal or electric power to be exchanged between the digital camera 100 and an external device. Specifically, the external IF control unit 106 comprises a USB (Universal Serial Bus), an interface for receiving supply of electric power for driving the camera (IF for driving the camera), and an interface for receiving supply of electric power for charging the battery of the camera (IF for charging the camera). Also, the external IF control unit 106 receives a control command from the cradle device 200, and outputs an image to the cradle device 200.

Also, we will say that the digital camera 100 according to the present exemplary embodiment further includes the stroboscope control unit 108. A setting-value storing unit 109 can store the setting value set by a command from the operating switch unit 105 or the cradle main unit 210. Note that with the digital camera 100 according to the present exemplary embodiment, an ID for identifying an individual has been set thereto.

The cradle device 200 comprises a pan/tilt driving unit 201, a locking mechanism control unit 202, an external IF control unit 203, a camera-platform control unit 204, a cradle control unit 205, a network control unit 206, an image storing unit 207, a sensor input unit 208, and a data temporary-storage unit 209.

The pan/tilt driving unit 201 performs the pan/tilt operation of the digital camera 100. The camera-platform control unit 204 controls the pan/tilt driving unit 201. The cradle control unit 205 controls the entire cradle device 200. The external IF control unit 203 supplies electric power to the digital camera 100, and controls the digital camera 100 via the USB. The external IF control unit 203 transmits a control command to the digital camera 100, and receives a response such as the image data from the digital camera 100.

The cradle camera-platform unit 220 has a connection mechanism for electrically connecting between the external IF control unit 106 of the digital camera 100 and the external IF control unit 203 of the cradle device 200 when the digital camera 100 is mounted on the cradle camera-platform unit 220. The external IF control unit 203 is configured so as to determine whether or not the digital camera 100 is mounted on the cradle camera-platform unit 220 based on the electric properties of the power source or USB. Note that it is needless to say that the method for external exchanging of control signals is not restricted to USB, and rather can be IEEE1394 or other related or equivalent external exchange apparatus and/or methods as known by one of ordinary skill in the relevant art.

The network control unit 206 is a network interface for connecting to the operating display terminals 301 and 302 to exchange a control command or other related or equivalent commands as known by one of ordinary skill in the relevant art. The network control unit 206 interprets the control command from the operating display terminals 301 and 302 via the network 400. The network control unit 206 controls the digital camera 100 and the cradle camera-platform unit 220 based on the interpreted control command, and also transmits the image photographed by the digital camera 100 to the operating display terminals 301 and 302 via the network 400. The image storing unit 207 is a storage device such as a hard disk, which can have a capacity capable of storing at least a part of the image photographed by the digital camera 100. The sensor input unit 208 is a portion for extracting the signal from the sensor 211 such as a human detection sensor as a trigger. The data temporary-storage unit 209 is memory for temporarily storing the data to be set to the digital camera 100.

The number of the cradle devices 200 to be connected to the network 400 and the number of the operating display terminals 301 and 302 to be connected to the network 400 are not restricted to those shown in FIGS. 1 and 2. Also, the network 400 can be any kind of digital network such as the Internet or intranet which has a sufficient bandwidth for transmitting a later-described command for controlling the camera, a compressed image signal, or other related or equivalent commands and signals as known by one of ordinary skill in the relevant art.

Note that with the present exemplary embodiment, the network protocol is the TCP/IP (UDP/IP) protocol, and in the following description, when an address is used, this address is an IP address. Also, the cradle device 200 (cradle main unit 210) and the operating display terminals 301 and 302 are to have been assigned an IP address. Also, the operating display terminals 301 and 302 can be realized for example, with a PC (Personal Computer), cell phone, or PDA (Personal Digital Assistant). Accordingly, the physical connection mode as to the network 400 can be not only a cable but also wireless. That is to say, the physical connection mode as to the network 400 can be any kind of connection mode made in accordance with the protocol.

Next, description will be made regarding the commands which the cradle device 200 receives from the operating display terminals 301 and 302 via the network 400.

With the present exemplary embodiment, the above commands are classified into (1) session commands, (2) camera control commands, (3) camera browsing commands, (4) camera setting commands, (5) cradle browsing commands, and (6) cradle setting commands. Hereinafter, each of the commands will be described.

Figure 10:
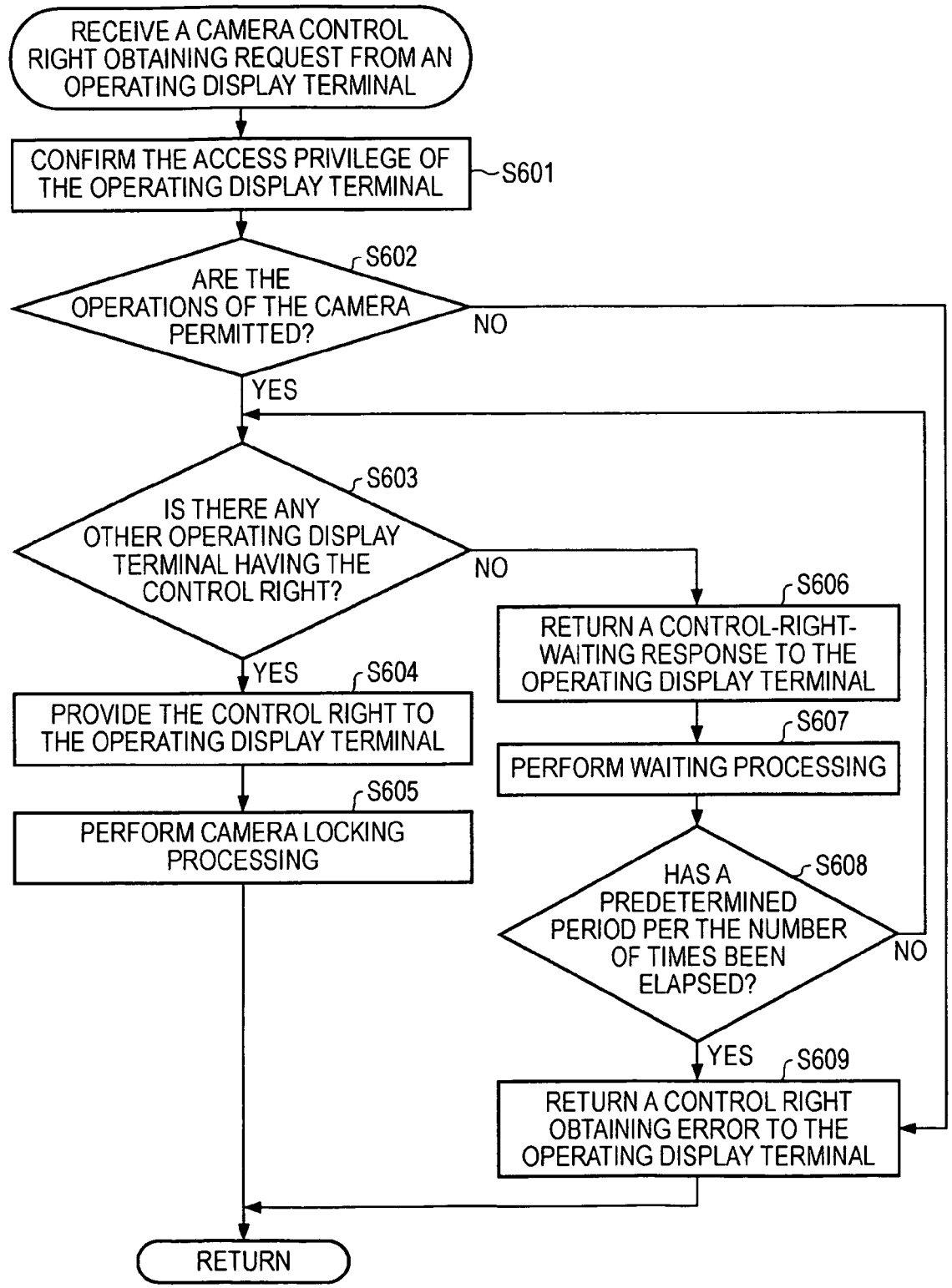
FIG. 10 illustrates an exemplary embodiment of the present invention, and is a flowchart for describing one example of the operation of the cradle device in the case of starting control of the digital camera.

Note that the commands cited here are only typical commands useful for describing the operation of the network camera system according to the present exemplary embodiment, and description regarding commands unnecessary for the description of the present exemplary embodiment will be omitted. FIG. 16 illustrates a part of the packet data formats of the above multiple commands. In FIG. 16, the packets include the address of the operating display terminal 301 or 302 which issued a command, and the password at the time of connection. Note that the packet formats of the commands other than the commands cited in FIG. 10 are configured in the same way as those shown in FIG. 16.

(1) Session Commands

The operating display terminals 301 and 302 always connect to the cradle device 200 first, establish a session with the cradle device 200, and then issue the following (2) through (6) commands. Examples of the session commands relating to such a session include the following:

Connection request command C101: a command for connecting to the cradle device 200 from the operating display terminal 301 or 302, and establishing a session.

Disconnection request command C102: a command for disconnecting the cradle device 200 from the operating display terminal 301 or 302, and closing a session.

(2) Camera Control Commands

The operating display terminals 301 and 302 can acquire the camera right of control (control right) first to perform control of the digital camera 100, and browsing operations of the image data stored in the image storing unit 103 of the digital camera 100. This is because it can be difficult for the multiple operating display terminals 301 and 302 to control the above camera control contemporaneously. Examples of the commands relating to acquisition of the camera control right include the following two commands.

Control right request command C201: a command for acquiring the camera control right.

Control right release request command C202: a command for releasing the camera control right.

Note that only a later-described viewfinder obtaining request is an exception, and need not obtain the camera control right. This is because of enabling all of the operating display terminals 301 and 302 under connection to display the image (viewfinder image) displayed on the viewfinder display unit 104 of the digital camera 100.

The operating display terminal possessing the camera control right enables one to perform later-described camera control operations. Note that some commands regarding control of the cradle device 200 as well as control of the digital camera 100 need to have the camera control right, so are also included in the camera control commands.

Release request command C211: a command for clicking the release (shutter) of the digital camera 100, and storing an image in at least any one of the image storing unit 103 of the digital camera 100 and the image storing unit 207 of the cradle device 200. The image-storing destination is selected with the parameter of the release request command C211. The resolution and image-quality of an image to be photographed based on the release request command C211 can be set higher than those of a viewfinder image.

Release half-press request command C212: a command for placing the release (shutter) of the digital camera 100 in a half-pressed state, or releasing the half-pressed state. The digital camera 100 optimizes exposure and a focal position by fixing the exposure and focal position at the point of receiving a release half-press request command C212 until the next release half-press request command C212 is received.

PT (Pan/Tilt) control request command C213: a command for controlling the pan/tilt angle of the cradle camera-platform unit 220.

Zoom control request command C214: a command for controlling the zoom magnification of the digital camera 100.

Stroboscope setting command C215: a command for specifying whether to perform stroboscope luminescence at the time of photographing.

Exposure setting command C216: a command for specifying automatic exposure (AE), manual exposure (ME), and exposure correction value.

Distance measuring point selection setting command C217: a command for setting a method for selecting one of multiple distance measuring points within a screen.

Focus setting command C218: a command for specifying a method for focusing. Any one of automatic focus (AF) control and manual focus (MF) control is specified with the focus setting command C218. Further, as for the parameters of the focus setting command C218, any one of automatic (AF), distant (AF-L), near (AF-M), intermediate (AF-S), and close-up (AF-C) is specified in the case of automatic focus (AF), and a focal position (distance) is specified in the case of manual focus (MF).

(3) Camera Browsing Commands

With the present exemplary embodiment, the term "camera browsing" means an operation relating to the image data stored in the image storing unit 103 of the digital camera 100, and is also a part of camera control. It can be difficult for multiple terminals to access the image data contemporaneously, so one of the terminals obtains the camera control right first, and then operates the image data. Note that a later-described image ID is an identifier for uniquely identifying an image, such as a file name.

Thumbnail obtaining request command C301: a command for obtaining the list of the thumbnails and image IDs of images.

Camera image obtaining request command C302: a command for specifying an image ID to obtain the image specified.

Camera image deletion request command C303: a command for specifying an image ID to delete the image specified.

Camera image copying request command C304: a command for specifying an image ID to copy the specified image to the image storing unit 207 of the cradle device 200, or to copy the specified image from the image storing unit 207 of the cradle device 200 to the digital camera 100.

(4) Camera Setting Commands

With the present exemplary embodiment, the term "camera setting" means an operation for modifying the settings of the digital camera 100. The administrator can modify this camera setting. Hereinafter, of various camera setting commands, only typical commands will be described.

Image-size setting command C401: a command for specifying an image size at the time of photographing an image, i.e., image resolution.

Image-quality setting command C402: a command for specifying the compression ratio of JPEG or MPEG4 using image quality.

Drive mode setting command C403: a command for specifying how to perform photographing at one time photographing trigger, such as single shot, continuous photographing, and interval timer photographing.

Photometry system setting command C404: a command for specifying a photometry system. Examples of a photometry system include evaluated photometry, centrally weighted photometry, spot photometry, and average photometry using distance measuring points.

Low-speed shutter setting command C405: a command for modifying the low-speed shutter speed of the blurring limits at the time of determining exposure.

(5) Cradle Browsing Commands

With the present exemplary embodiment, the term "cradle browsing" means an operation relating to the image data stored in the image storing unit 207 of the cradle device 200. Multiple people can access the image data contemporaneously, and accordingly do not need to obtain the camera control right to perform this cradle browsing.

Thumbnail obtaining request command C501: a command for obtaining the list of the thumbnails and image IDs of images.

Image obtaining request command C502: a command for specifying an image ID to obtain the image specified.

Image deletion request command C503: a command for specifying an image ID to delete the image specified.

(6) Cradle Setting Commands

With the present exemplary embodiment, the term "cradle setting" means an operation for modifying the settings of the cradle device 200. The administrator can modify this cradle setting. Hereinafter, of various cradle setting commands, only typical commands will be described.

IP address setting command C601: a command for setting the IP address of the cradle device 200 itself. The IP address of the cradle device 200 is basically set automatically by using UPnP (Universal Plug and Play) or other related or equivalent methods as known by one of ordinary skill in the relevant art. If there is the need to modify the IP address following setting an IP address, the IP address can be set again using this IP address setting command C601. Also, whether or not an IP address is set automatically using UPnP or DHCP (Dynamic Host Configuration Protocol), it can be set by using the IP address setting command C601.

Informing destination mail address command C602: a command for setting the mail address of a destination to be informed of the action having been detected through the sensor 211 or images by mail when detecting an action through the sensor 211 or images.

Access permission address command C603: a command for setting a permission address which is connectable. A permission level differs for each command. Accordingly, with the access permission address command C603, each address and the command category thereof are specified in pairs.

Password command C604: a command for setting an access password for requesting the device at the time of connection from a device having an address other than the addresses which permit access.

Preset command C605: a command for presetting and registering the control items of the digital camera 100 beforehand, such as a pan/tilt angle, zoom setting, exposure setting, focal setting, stroboscope setting, and photographing method. The digital camera 100 performs display and photographing along this preset content. With the present exemplary embodiment, a plurality of preset can be specified. In the event of specifying a plurality of preset, the preset contents are retained within the cradle device 200 in a format such as illustrated in the following Table 1. Also, a home position can also be set by using the preset command C605.

[Table 1]

Detection region command C607: a command for specifying an motion detection region on an image. A detection region differs depending on a field angle. Accordingly, the above motion detection region is set using pan-tilt-zoom values, and the position of a rectangular region on an input image.

PT restricted range command C608: a command for determining the restricted regions of a pan angle, a tilt angle, and a zoom value. This restriction is not for restricting the mechanical limits of the cradle device 200 but for restricting a field angle because of privacy issues. Restriction of the zoom value, following the cradle device 200 receiving a PT restricted range command C608, is realized by setting the zoom value so as to be in the range determined with the PT restricted range command C608 at the time of setting the zoom value to the digital camera 100.

Sensor setting command C609: a command for setting whether or not the sensor 211 is employed.

Figure 3:
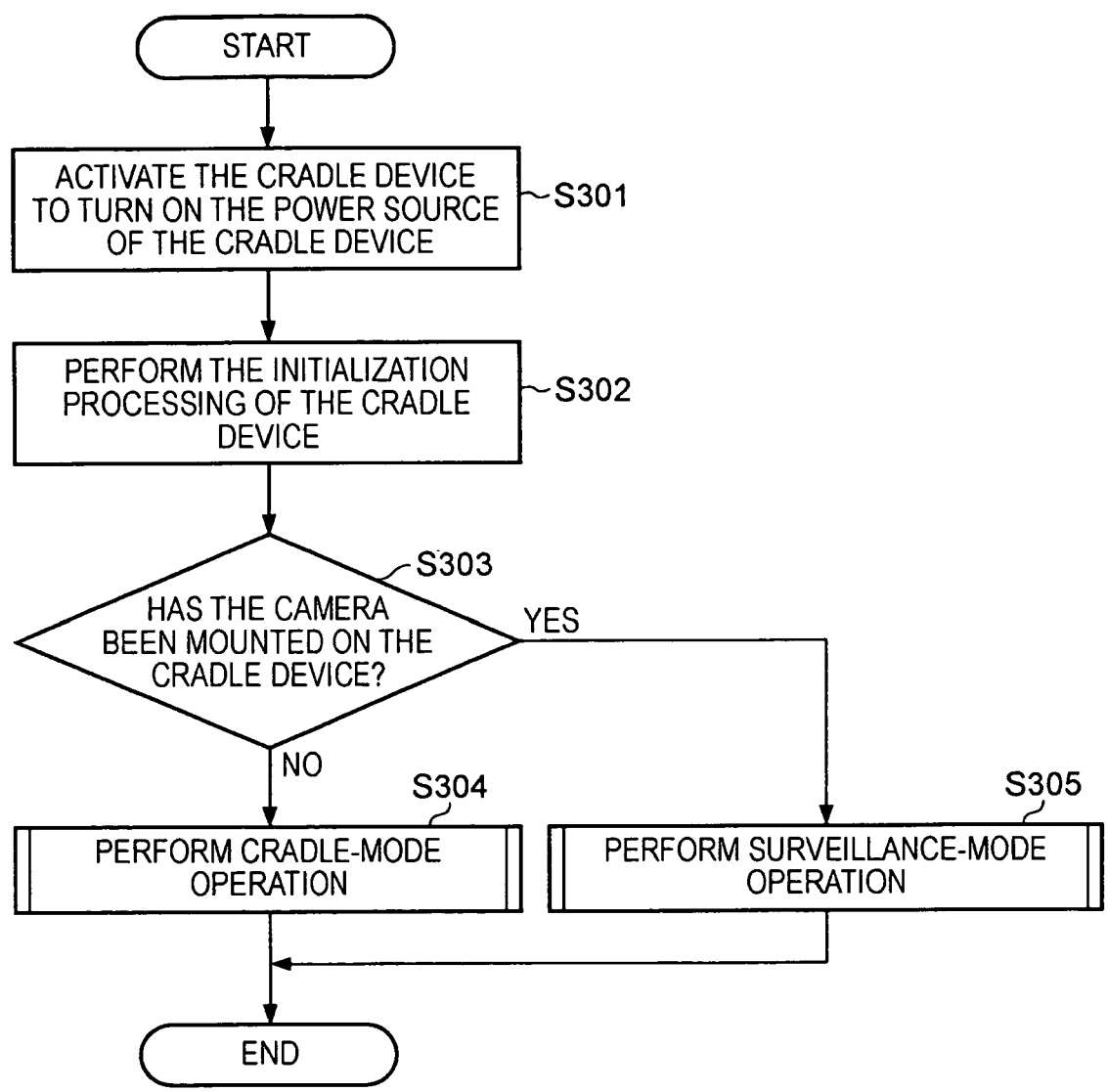
FIG. 3 illustrates an exemplary embodiment of the present invention, and is a flowchart for describing one example of the overall operation of the cradle device.

Next, one example of the operation of the cradle device 200 will be described. FIG. 3 is a flowchart for describing one example of the overall operation of the cradle device 200. The cradle control unit 205 executes the flowchart shown in FIG. 3 based on the program stored in the cradle control unit 205 beforehand.

The cradle device 200, according to the present exemplary embodiment, can have two operation modes. Specifically, these two operation modes are a cradle mode and a surveillance mode. The cradle mode is an operation mode when the digital camera 100 is not mounted on the cradle device 200. The surveillance mode is an operation mode when the digital camera 100 is mounted on the cradle device 200.

Also, surveillance mode commands in the surveillance mode denote (2) camera control commands, and (3) camera browsing commands.

Upon the cradle device 200 being activated to turn on the power source (step S301), the cradle control unit 205 executes the initialization processing of the cradle device 200 (step S302). Subsequently, the cradle control unit 205 determines whether or not the digital camera 100 is mounted on the cradle device 200. Thus in the event that the digital camera 100 is not mounted on the cradle device 200, the cradle control unit 205 performs the operation in the cradle mode (step S304). On the other hand, in the event that the digital camera 100 is mounted on the cradle device 200, the cradle control unit 205 performs the operation in the surveillance mode (step S305).

Figure 4:
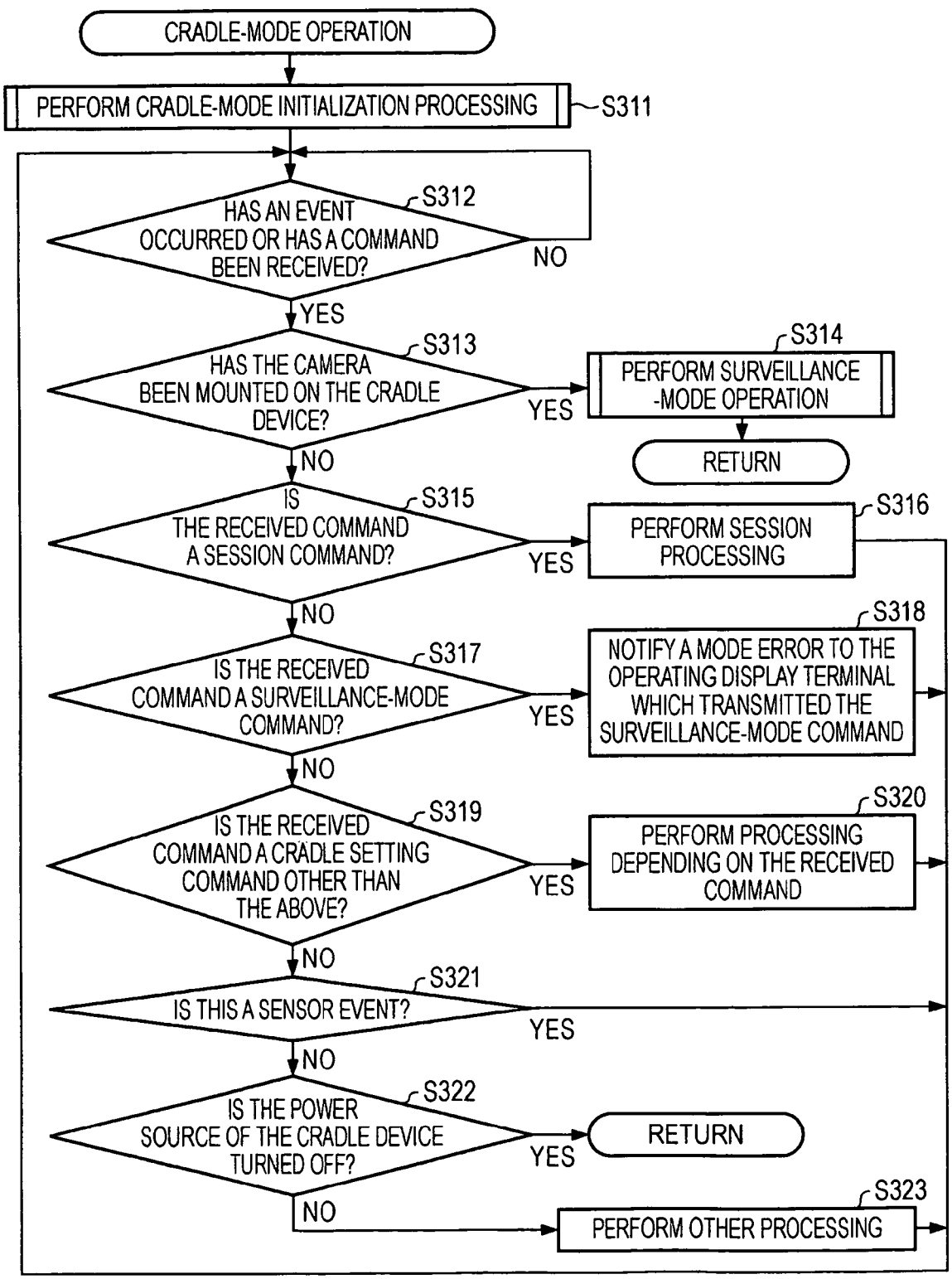
FIG. 4 illustrates an exemplary embodiment of the present invention, and is a flowchart for describing one example of the operation in a cradle mode.

FIG. 4 is a flowchart for describing one example of the operation in the cradle mode in step S304 in FIG. 3.

Upon starting the operation in the cradle mode, the cradle control unit 205 performs the initialization processing in the cradle mode in FIG. 7, which will be described later (step S311). Subsequently, the cradle device 200 awaits until an event occurs, or the cradle device 200 receives a command from the operating display terminal 301 or 302 (step S312).

Note that with the present exemplary embodiment, one example of events is the mounting of the digital camera 100 to the cradle device 200, and detaching of the digital camera 100 from the cradle device 200. Also, one example of an event is a transition to the detected state from the undetected state of the sensor 211. Another example of events is a transition to the undetected state from the detected state of the sensor 211. A further example of events is change in the state of the digital camera 100. The commands are as described above.

If the event which has occurred is an event where the digital camera 100 is mounted on the cradle device 200 (YES in step S313), the cradle control unit 205 performs the operation in the surveillance mode (step S314). Note that this operation in the surveillance mode is the same as a later-described flowchart in FIG. 5.

In the event that the cradle device 200 receives a session command from an operating display terminal (YES in step S315), the cradle control unit 205 performs the starting/ending processing of a session such as described in the above (1) Session commands (step S316).

In the event of the cradle device 200 receiving a surveillance mode command from an operating display terminal (YES in step S317), the cradle device 200 cannot accept this command since the digital camera 100 is not mounted on the cradle device 200. Accordingly, the cradle control unit 205 returns an error signal to the operating display terminal which transmitted the surveillance mode command (step S318). That is to say, the driving operation of the pan/tilt driving unit 201 can be prohibited.

Note that in the event that the cradle device 200 receives any one of (4) camera setting command, (5) cradle browsing command, and (6) cradle setting command, which is a command other than the surveillance mode commands (YES in step S319), the cradle control unit 205 proceeds to step S320. The cradle control unit 205 performs the operation corresponding to the received command (step S320). Also, in the event that the event which occurred is an event relating to the sensor 211 (YES in step S321), the cradle control unit 205 ignores the event in this cradle mode, and returns to step S312.

In the event that the event which occurred is not an event relating to the sensor 211 (NO in step S321) but an event where the power source of the cradle device 200 is OFF (YES in step S322), the cradle control unit 205 returns to the main flowchart in FIG. 3. On the other hand, in the event that the power source of the cradle device 200 is not OFF, the cradle control unit 205 performs the other processing (step S323).

Figure 5:
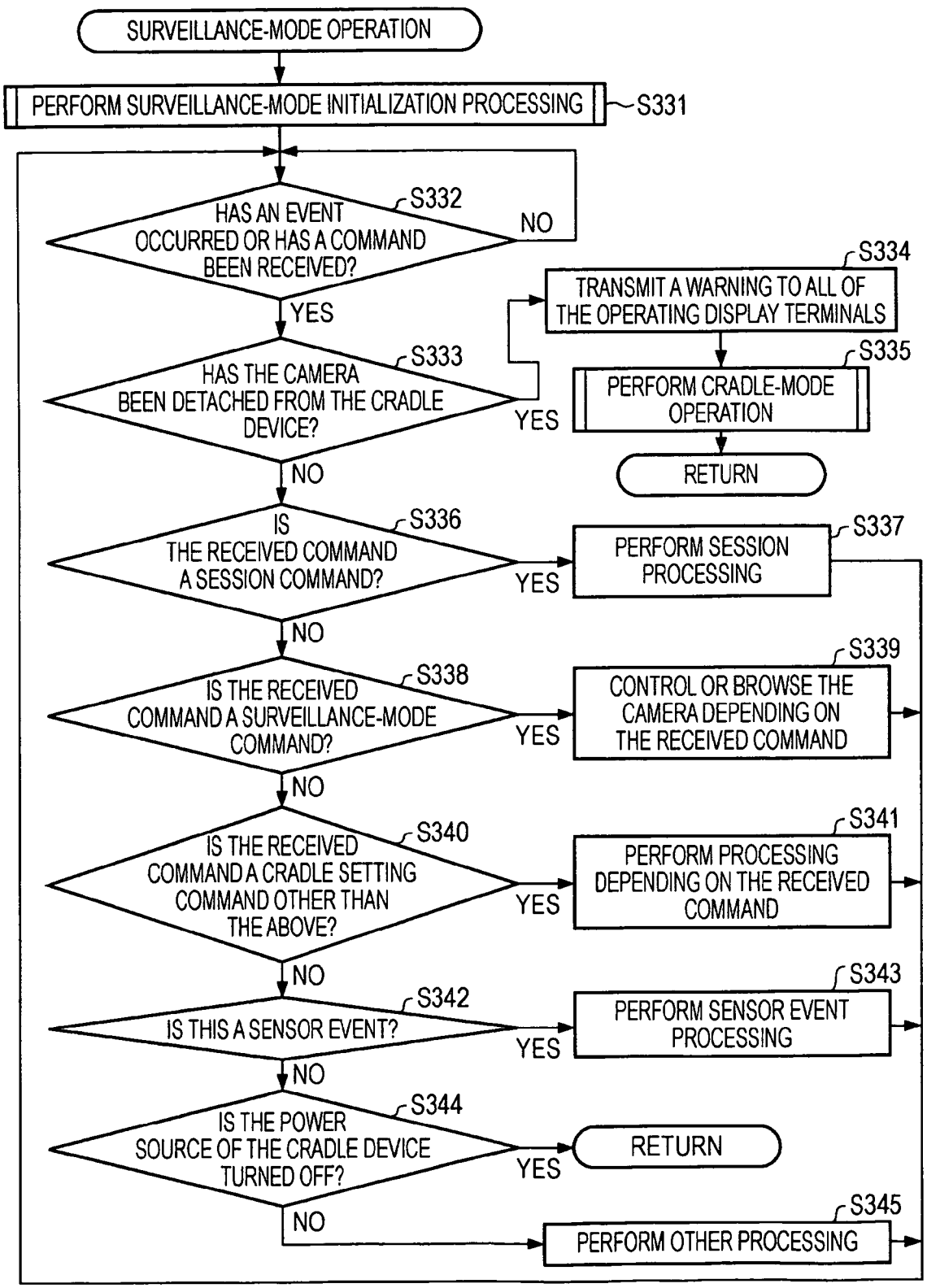
FIG. 5 illustrates an exemplary embodiment of the present invention, and is a flowchart for describing one example of the operation in a surveillance mode.

FIG. 5 is a flowchart for describing one example of the operation of the cradle device 200 in the surveillance mode in step S305 in FIG. 3.

Upon starting the operation in the surveillance mode, the cradle control unit 205 performs the initialization processing in the surveillance mode in FIG. 6, which will be described later (step S331). Subsequently, as with the operation in the cradle mode shown in FIG. 4, the cradle device 200 awaits until an event occurs, or the cradle device 200 receives a command from the operating display terminal 301 or 302 (step S332).

If the event which occurred is an event where the digital camera 100 is detached (step S333), the cradle control unit 205 informs (warns) all of the operating display terminals establishing a session that the digital camera 100 is detached (step S334). Subsequently, the cradle control unit 205 performs the operation in the cradle mode (step S335). This operation in the cradle mode is the same as the flowchart shown in FIG. 4.

In the event that the cradle device 200 receives a session command from the operating display terminal 301 or 302 (YES in step S336), the cradle control unit 205 performs the starting/ending processing of a session such as described in the above (1) Session commands (step S337).

In the event that the cradle device 200 receives a surveillance mode command from the operating display terminal 301 or 302, i.e., in the event of receiving any one of (2) camera control command and (3) camera browsing command (YES in step S338), the cradle device 200 accepts the command. Subsequently, the cradle control unit 205 executes the processing corresponding to the accepted command (step S339).

Figure 20:
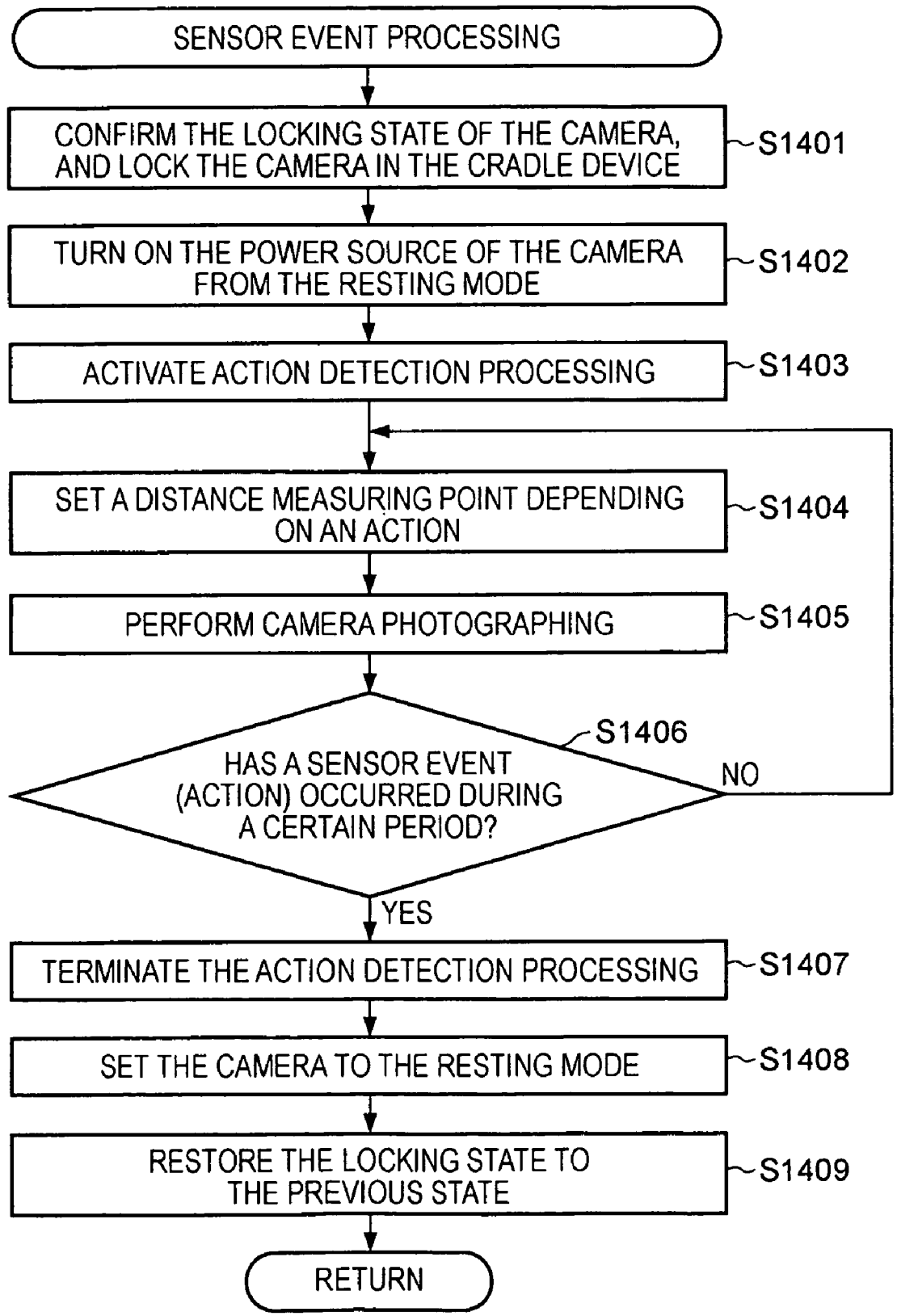
FIG. 20 illustrates an exemplary embodiment of the present invention, and is a flowchart for describing one example of the operation of the cradle device in the case of a sensor event caused by the operation of a sensor which is set to a mode for detecting operation.
Figure 21:
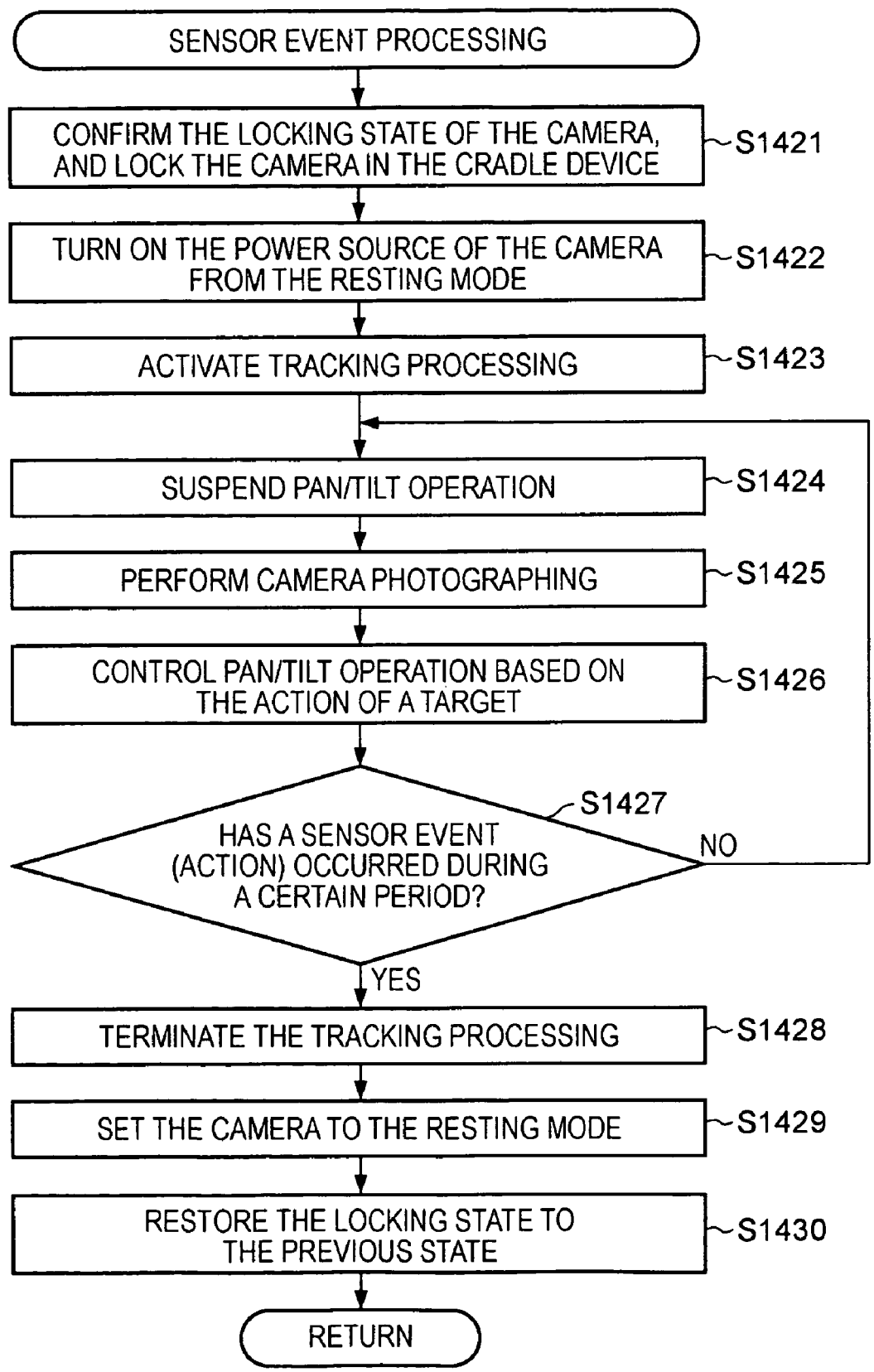
FIG. 21 illustrates an exemplary embodiment of the present invention, and is a flowchart for describing one example of the operation of the cradle device in the case of a sensor event occurring by the operation of the sensor which is set to a mode for tracking a target.

Note that the cradle device 200 can receive a command other than the surveillance mode commands, i.e., (4) camera setting command, (5) cradle browsing command, or (6) cradle setting command (YES in step S340). In this case, the cradle control unit 205 performs the operation corresponding to the received command (step S341). Also, in the event that the event which occurred is determined by the cradle control unit 205 as an event relating to the sensor 211 (YES in step S342), the cradle control unit 205 performs later-described sensor event processing such as illustrated in FIGS. 20 and 21 (step S343).

In the event that the power source of the cradle device 200 is OFF (YES in step S344), the processing returns to the main flowchart shown in FIG. 3. On the other hand, in the event that the power source of the cradle device 200 is not OFF, the cradle control unit 205 performs the other processing (step S345).

Next, one example of the surveillance mode initialization processing in step S331 in FIG. 5 will be described with reference to the flowchart in FIG. 6.

First, the cradle control unit 205 outputs a command for turning on the power source of the digital camera 100 (step S401). That is to say, if the power source of the digital camera 100 is not ON, the cradle control unit 205 turns on the power source of the digital camera 100. Next, the cradle control unit 205 obtains the camera ID possessed by the digital camera 100, and performs camera authentication processing for determining whether or not the cradle device 200 accepts the digital camera 100 (step S402). Note that the cradle device 200 performs this camera authentication processing by comparing the camera ID registered beforehand and the camera ID possessed by the digital camera 100.

Figure 19:
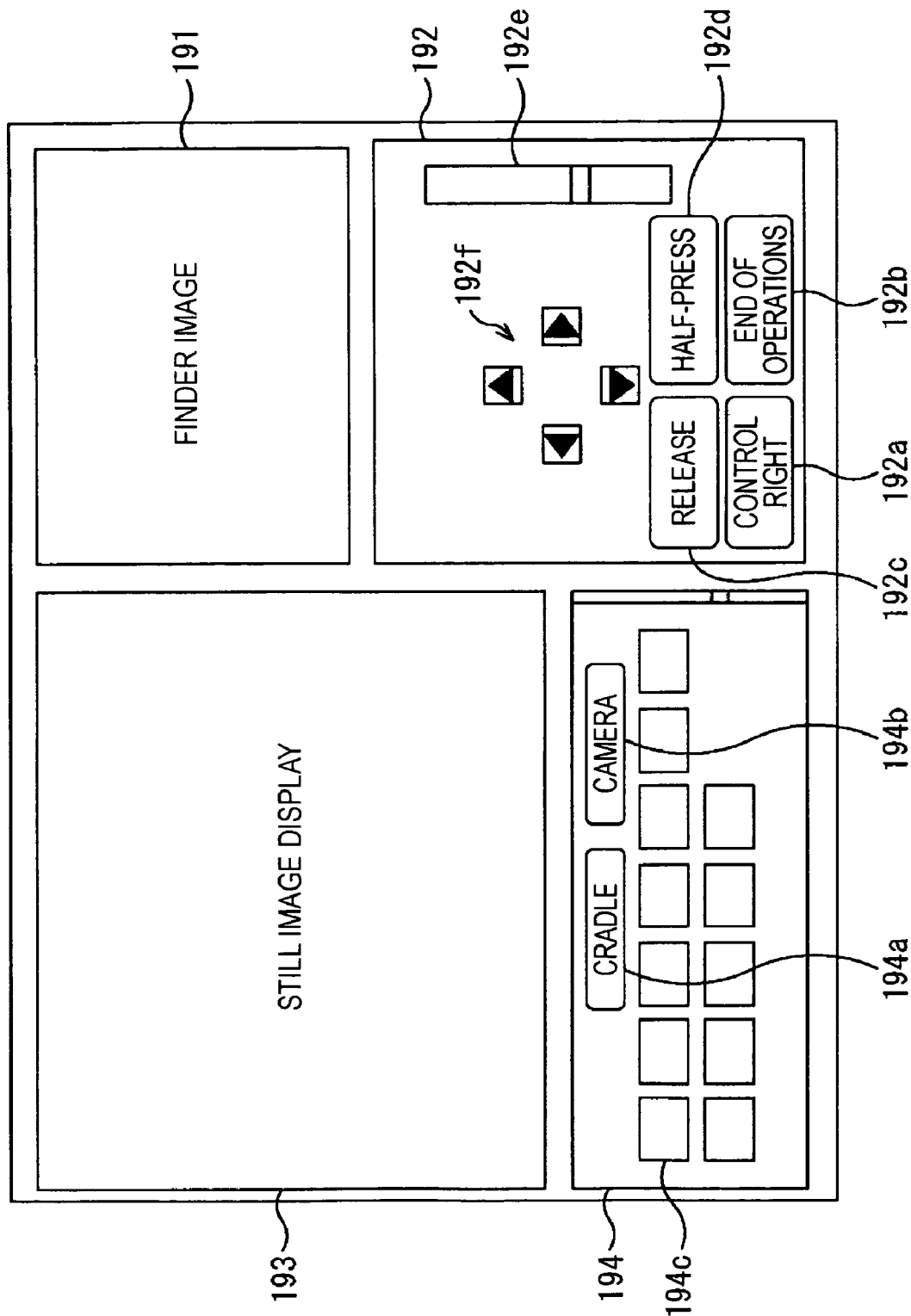
FIG. 19 illustrates an exemplary embodiment of the present invention, and is a diagram illustrating one example of the screen to be displayed on the display device of an operating display terminal.

Thus in the event that the digital camera 100 is authenticated, the cradle control unit 205 reads cradle setting data from the digital camera 100 (step S403). Here, the cradle setting data is basically the same as the above-described parameters of the (6) cradle setting commands. The cradle setting data is set and modified on the digital camera 100 side using a later-described GUI (Graphical User Interface) such as illustrated in FIG. 19. Also, the items of the cradle setting data are the same as the items which can be set by the cradle setting command, i.e., an IP address, an informing destination mail address, an access permission address, a password, preset, a detection region, a PT restricted range, and sensor setting. The specific contents of these are the same as those of the above cradle setting command, so description thereof will be omitted.

Also, in the event that later-described surveillance mode parameter data is stored in the data temporary-storage unit 209 of the cradle device 200, the cradle control unit 205 reads out the surveillance mode parameters (step S404). Subsequently, the cradle control unit 205 sets the readout surveillance mode parameters as the camera setting value and various types of photographing parameters most appropriate for the digital camera 100 operating in the surveillance mode (step S405 and step S406).

With the present exemplary embodiment, the surveillance mode parameters are the parameters of the digital camera 100 obtained by considering photographing conditions in light of a case in which the digital camera 100 is used not on hand but by mounting on the cradle device 200, or a case in which an image is transmitted. For example, the surveillance mode parameters are made up of the following parameters.

Image Size and Image Quality Settings

In the surveillance mode, of the choices included in the digital camera 100, the image size and image quality at the normal photographing are set such that the image size (resolution) is small, and also the image quality is low, in light of communication. However, in a later-described continuous photographing mode, continuous photographing can be set with multiple sizes and multiple images.

Drive Mode Setting

Regarding whether either single shot photographing or continuous photographing is performed at one time release trigger is set. Also, continuous photographing of images having a different image size and a different image quality can be performed. The data to be transmitted to the digital camera 100 and the data retained at a local can have a different image size and a different image quality at the time of continuous photographing of images.

Low-Speed Shutter Setting

The limit value of image blurring due to camera shake caused at the time of determining exposure is set. This limit value can be set lower than the case of photographing an image while holding the digital camera 100 on hand.

Focal Setting

A focal point is set. The speed of automatic focusing can be increased by restricting the range of automatic focusing with indoor usage as precondition, for example. In the event that a focal position can be fixed depending on the installation environment of the digital camera 100, a focal position can be fixed.

Following the digital camera 100 being set to the surveillance mode in accordance with the above surveillance mode parameters, the cradle control unit 205 executes an instruction for setting detection with the operating switch unit 105 of the digital camera 100 invalid to restrict the user from operating at his/her own choice (step S407). Then, user can recognize that the digital camera 100 is set in the surveillance mode through the finder 104.

Next, in step S403, the cradle control unit 205 sets the cradle setting data read from the digital camera 100 to the cradle device 200 to enable this data (step S408). Subsequently, the cradle control unit 205 initializes the position of the cradle camera-platform unit 220 to a home position in accordance with the enabled cradle setting data (step S409).

Further, the cradle control unit 205 informs a substantial portion of the operating display terminals under connection that the cradle device 200 has been set to the surveillance mode (step S410). Subsequently, the cradle control unit 205 instructs to set the digital camera 100 to the resting mode (step S411). Note that the resting mode means the state of the digital camera 100 which can perform photographing immediately after the power source being turned on. Specifically, for example, in this resting mode, the power source of the digital camera 100 is turned off while keeping a state in which the lens of the digital camera 100 is extended.

Next, one example of the cradle mode initialization processing in step S331 in FIG. 4 will be described with reference to the flowchart in FIG. 7.

First, the cradle control unit 205 detects that the digital camera 100 has been detached from the cradle camera-platform 220. Then, the cradle control unit 205 instructs to the camera-platform control unit 204 to drive the pan/tilt driving unit 201. Specifically, the pan/tilt driving unit 201 drives the pan/tilt position of the cradle camera-platform unit 220 to a position where the camera can be mounted with mechanical ease (step S421). Subsequently, the cradle control unit 205 informs a substantial portion of the operating display terminals under connection that the cradle device 200 has been set to the cradle mode (step S422).

Next, one example of the operation at the time of the cradle device 200 receiving a session command will be described with reference to the flowcharts in FIGS. 8 and 9. With the present exemplary embodiment, description will be made assuming that the same operation is performed regardless of whether in the surveillance mode or in the cradle mode.

Figure 8B:
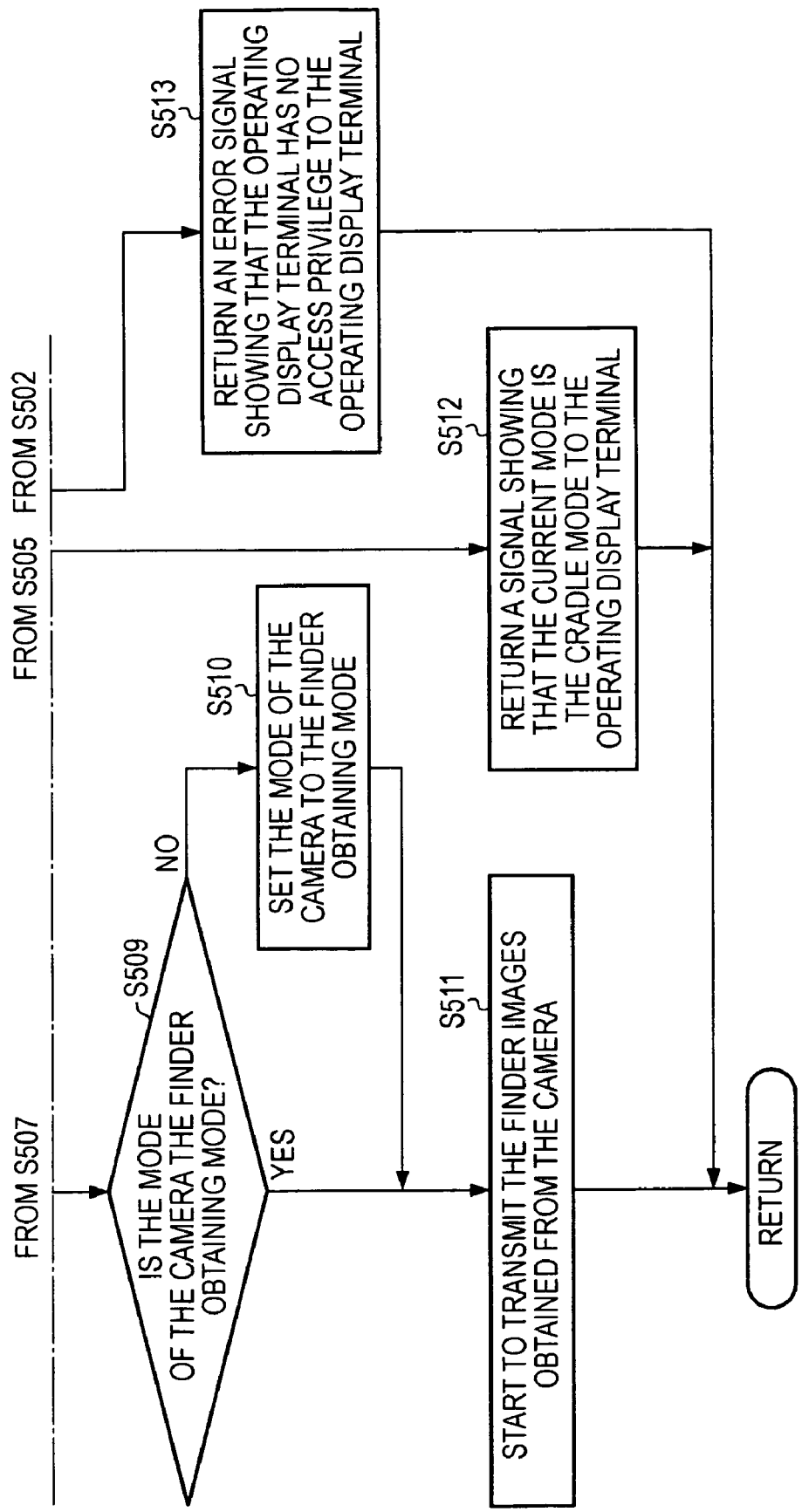
FIG. 8 illustrates an exemplary embodiment of the present invention, and is a flowchart for describing one example of the operation of the cradle device in the case of receiving a connection request command as a session command.

FIG. 8 is a flowchart for describing one example of the operation of the cradle device 200 in the case of receiving a connection request command C101 as a session command.

In FIG. 8, upon the cradle control unit 205 receiving a connection request command C101 from an operating display terminal, the cradle control unit 205 confirms the access privilege of the operating display terminal which issued a connection request (step S501). Subsequently, the cradle control unit 205 determines whether or not access of the operating display terminal which issued the connection request is allowed (step S502). Thus in the event of rejecting the access, the cradle control unit 205 returns an error signal indicating that the operating display terminal which issued the connection request has no access privilege to the operating display terminal which issued the connection request (step S513).

On the other hand, in the event of allowing the access, the cradle control unit 205 performs connection establishment processing as to the operating display terminal which issued the connection request (step S503). Subsequently, the cradle control unit 205 registers the address of the operating display terminal which issued the connection request into an address list within the data temporary-storage unit 209 (step S504). Note that the address list is a list made up of the addresses of at least a substantial portion of the operating display terminals which are now connected to the cradle device 200. For example, the IP addresses (IP address 1, IP address 2, IP address 3, and so on through IP address N (N is variable)) of all of the operating display terminals which are now connected to the cradle device 200 are registered into the address list.

Following registering the address of the operating display terminal which issued the connection request into the address list, the cradle control unit 205 determines whether or not the current mode is the surveillance mode (step S505). Thus in the event that the current mode is the surveillance mode, the cradle control unit 205 returns a signal indicating that the current mode is the surveillance mode to the operating display terminal which issued the connection request (step S506).

Next, the cradle control unit 205 determines whether or not the power source of the digital camera 100 is ON (step S507). Thus in the event that the power source of the digital camera 100 is not ON, the cradle control unit 205 instructs to turn on the power source of the digital camera 100 (step S508).

Thus, upon the power source of the digital camera 100 being turned on, the cradle control unit 205 determines whether or not the current mode of the camera 100 is the viewfinder obtaining mode (step S509). Thus in the event that the current mode of the digital camera 100 is not the viewfinder obtaining mode, the cradle control unit 205 instructs to set the mode of the digital camera 100 to the viewfinder obtaining mode (step S510).

Subsequently, upon the mode of the digital camera 100 being changed to the viewfinder obtaining mode, the cradle control unit 205 starts to transmit viewfinder images obtained from the digital camera 100 to the operating display terminal which issued the connection request in a continuous manner (step S511). This processing in step S511 allows the viewfinder images to be transmitted to a substantial portion of the operating display terminals under connection in accordance with the above address list. Note that the viewfinder obtaining mode is a mode in a state in which viewfinder images are obtained from the digital camera 100. In a state in which no viewfinder image is transmitted to any of the operating display terminals, the digital camera 100 is in non-viewfinder obtaining mode.

In the above step S505, in the event that the current mode is not the surveillance mode, the digital camera 100 is not mounted on the cradle device 200 (cradle camera-platform unit 220). Thus, viewfinder images cannot be obtained. Accordingly, the above processing in steps S506 through S511 is unnecessary. In this case, the cradle control unit 205 returns a signal that the current mode is the cradle mode to the operating display terminal which issued the connection request (step S512).

Incidentally, the viewfinder images are images to be displayed on the viewfinder display unit (liquid crystal display device) 104 provided in the digital camera 100. The viewfinder images are images to be displayed with low resolution beforehand by performing thinning-out processing at the time of photographing a high-resolution image at the digital camera 100. The viewfinder images are configured so as to be extracted from the digital camera 100 to the cradle device 200 as electronic data.

Figure 9:
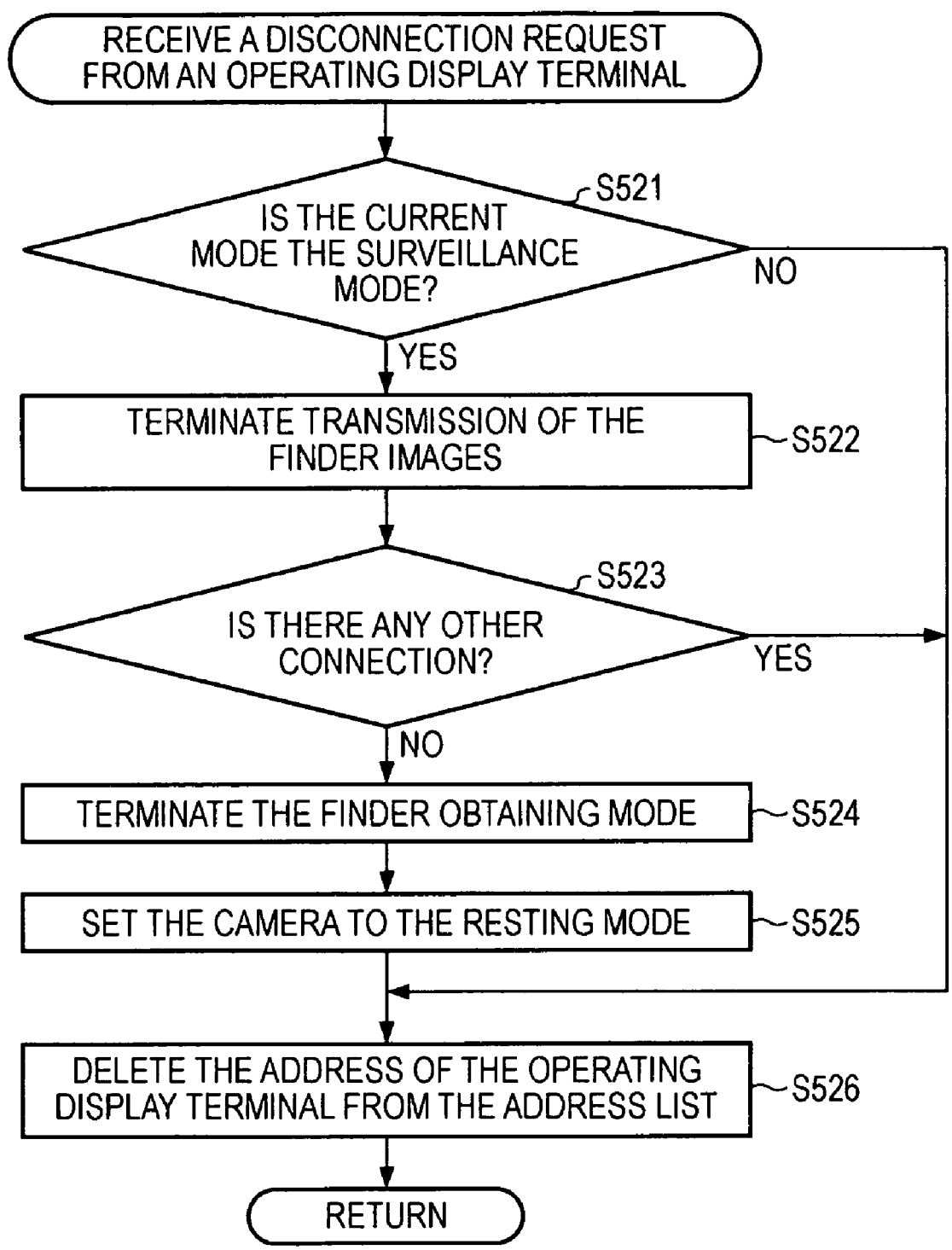
FIG. 9 illustrates an exemplary embodiment of the present invention, and is a flowchart for describing one example of the operation of the cradle device in the case of receiving a disconnection request command as a session command.

FIG. 9 is a flowchart for describing one example of the operation of the cradle device 200 in the case of receiving a disconnection request command C102 as a session command.

In FIG. 9, upon receiving a disconnection request from the operating display terminal 301 or 302, the cradle control unit 205 basically performs the processing opposite to the processing in the case of receiving a connection request shown in FIG. 8. That is to say, the cradle control unit 205 determines whether or not the current mode is the surveillance mode (step S521). In the event of the surveillance mode, the cradle control unit 205 terminates transmission of the viewfinder images (step S522). Subsequently, in the event of determining that there is no other operating display terminal under connection (NO in step S523), the cradle control unit 205 terminates the viewfinder obtaining mode (step S524), and sets the digital camera 100 to the resting mode (step S525). Further, the cradle control unit 205 deletes the address of the operating display terminal which issued the disconnection request from the address list regardless of whether or not the current mode is the surveillance mode (step S526).

Next, one example of the operation in the case of starting control of the digital camera 100 and in the case of ending the control will be described with reference to the flowcharts in FIGS. 10 and 11. The operating display terminals 301 and 302 need to obtain the camera control right and retain this prior to issuing the above (2) camera control command and (3) camera browsing command.

FIG. 10 is a flowchart for describing one example of the operation of the cradle device 200 in the case of starting control of the digital camera 100.

In FIG. 10, the cradle device 200 receives a control right request command C210 from the operating display terminal 301 or 302. Then, the cradle control unit 205 confirms the access privilege of the operating display terminal which requested the control right of the digital camera 100 (step S601). The cradle control unit 205 determines whether or not the operating display terminal which requested the control right is allowed to perform the operations of the digital camera 100 (step S602).

Thus for example let us say that the operating display terminal which requested the control right of the digital camera 100 has the access privilege relating to control of the camera, and is an operating display terminal which is allowed to perform the operations of the digital camera 100. In this case, the cradle control unit 205 determines whether or not the operating display terminal can take the control right, i.e., regarding whether or not there is another operating display terminal now possessing the control right (step S603). Thus in the event that there is not another operating display terminal possessing the control right, and the control right is available, the cradle control unit 205 provides the control right to the operating display terminal which requested the control right (step S604).

Next, the cradle control unit 205 instructs the camera-platform control unit 204 to mechanically lock the digital camera 100 in the cradle camera-platform unit 220 using locking mechanisms 221a and 221b (step S605). This processing in step S605 can restrict the digital camera 100 from detaching from the cradle camera-platform unit 220 when attempting to control the digital camera 100.

In the above step S603, in the event that there is another operating display terminal possessing the control right, and the control right is unavailable, the cradle control unit 205 returns a control right waiting response to the operating display terminal which requested the control right (step S606). Next, the cradle control unit 205 performs waiting processing (step S607), and determines whether or not a certain period has elapsed, or whether or not the cradle control unit 205 has performed the waiting processing a certain number of times (step S608). As for a specific method of the waiting processing, processing, such that the request is queued for a certain period or a certain times and it will be given up if its turn has not come, can be cited for example. However, the waiting processing can be any processing as long as the system for providing the control right can be operated, and this processing is not an essential feature, so detailed description thereof will be omitted here.

In the above step S608, in the event that a certain period has elapsed, or the waiting processing has been performed a certain number of times, but the control right could not be obtained at all, the cradle control unit 205 returns a control right obtaining error response to the operating display terminal which requested the control right. Thus, the operating display terminal which requested the control right is informed that the digital camera 100 cannot be controlled (step S609).

Figure 11:
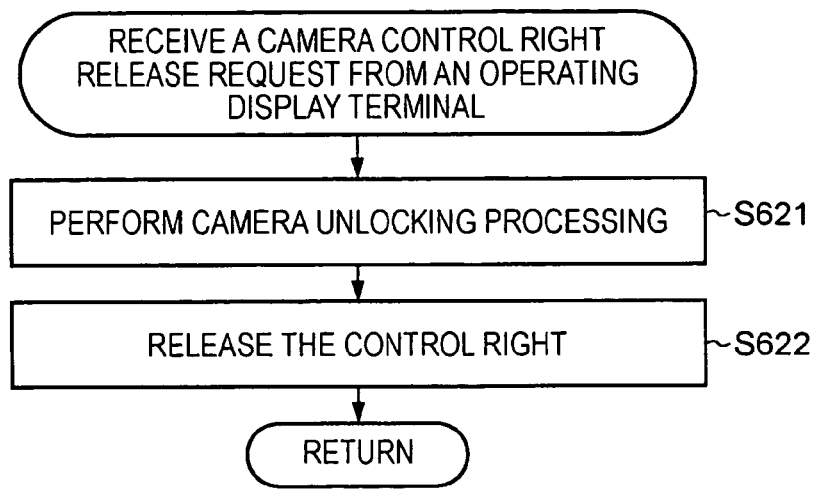
FIG. 11 illustrates an exemplary embodiment of the present invention, and is a flowchart for describing one example of the operation of the cradle device in the case of terminating control of the digital camera.

FIG. 11 is a flowchart for describing one example of the operation of the cradle device 200 in the case of terminating control of the digital camera 100.

The cradle device 200 receives a control right release request command C202 from the operating display terminal which will abandon the control right. In response to this, the cradle control unit 205 gives an instruction to the camera-platform control unit 204. The camera-platform control unit 204 activates the locking mechanisms 221a and 221b to release the mechanical lock as to the digital camera 100 (step S621). Moreover, the cradle control unit 205 releases the control right (step S622). According to such an arrangement, the cradle device 200 can arbitrate the operations from the multiple operating display terminals 301 and 302 as to the digital camera 100, and also can restrict the digital camera 100 from detaching from the cradle device 200 when controlling the digital camera 100.

Next, description will be made regarding one example of the operation of the cradle device 200 in the case of receiving the above (2) camera control command or (3) camera browsing command from the operating display terminal which obtained the control right with reference to the flowcharts in FIGS. 12 and 13.

Figure 12:
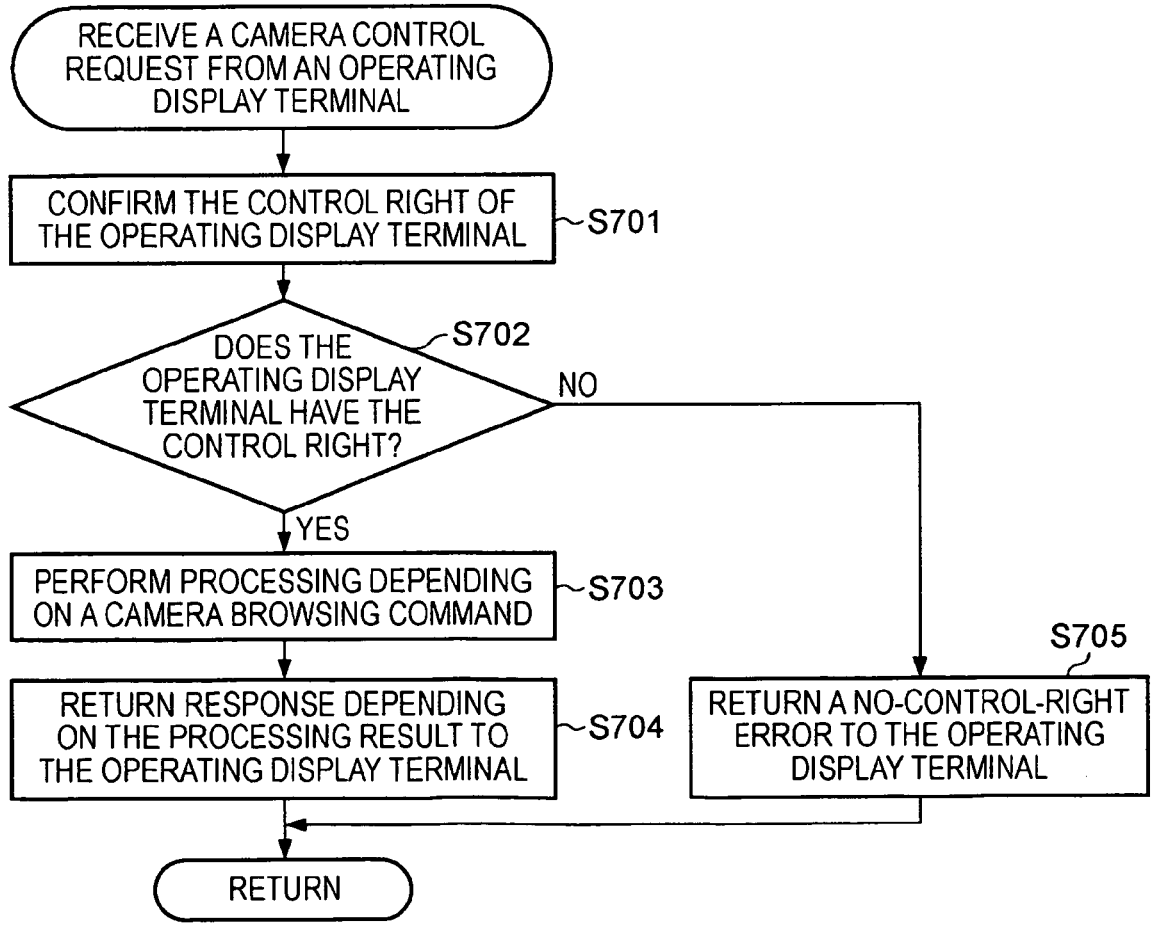
FIG. 12 illustrates an exemplary embodiment of the present invention, and is a flowchart for describing one example of the operation of the cradle device in the case of receiving a camera control command.

FIG. 12 is the operation processing flowchart of the cradle device 200 in the case of receiving a camera control command.

In FIG. 12, the cradle device 200 receives a camera control command, i.e., one of the commands C211 through C218. Then, the cradle control unit 205 confirms the control right as to the digital camera 100 of an operating display terminal serving as the originator of the command which is one of the commands C211 through C218 (step S701). In step S702, in the event that the cradle control unit 205 determined that the operating display terminal has no control right of the digital camera 100, the cradle control unit 205 returns an error signal to the operating display terminal serving as the originator of one of the commands C211 through C218 (step S705). On the other hand, in step S702, in the event of the operating display terminal possessing the control right of the digital camera 100, the cradle control unit 205 performs the processing corresponding to the received camera control command (step S703).

With the processing corresponding to the camera control command, the control parameters of the digital camera 100 can be controlled by the cradle control unit 205 issuing the control command to the digital camera 100 via the USB.

For example, the received camera control command is a release request command C211, the cradle control unit 205 transmits the control command indicating the request of release operation to the digital camera 100. Thus, the digital camera 100 performs the same processing as the case of detecting that the release button has been pressed, i.e., photographing processing. Subsequently, the photographed image is stored in at least any one of the image storing unit 103 of the digital camera 100 and the image storing unit 207 of the cradle device 200.

Note that regarding whether the photographed image is stored in either the image storing unit 103 of the digital camera 100 or the image storing unit 207 of the cradle device 200 can be selected with the argument of the above release request command C211.

Also, in the event that the received camera control command is a zoom control command C214, the zoom operation of the digital camera 100 is controlled by the cradle control unit 205 transmitting the control command indicating the request of zoom operation to the digital camera 100 via the USB.

Also, in the event that the received camera control command is an exposure setting command C216, the cradle control unit 205 transmits the control command indicating the request of exposure setting to the digital camera 100 via the USB. Thus, the exposure value of the digital camera 100 can be modified.

Note that in the event that the received camera control command is a release half-press request command C212, the digital camera 100 needs to perform so-called shutter half-press processing. That is to say, the digital camera 100 fixes or improves exposure, and focal position at the point of receiving the control command transmitted from the cradle device 200 depending on the release half-press request command C212. Fixing of exposure, and focal position is retained until the release half-press request is released, or the release request is received. Note that the types of the camera control commands are as the above-described commands C211 through C218, so the description of a substantial portion of the detailed operation for each command will be omitted here.

In the above step S702, in the event of determining that the operating display terminal which issued the command possessing no control right, the cradle control unit 205 returns a response regarding the result of the command processing (success or error) to the operating display terminal which issued the command (step S704).

Figure 13:
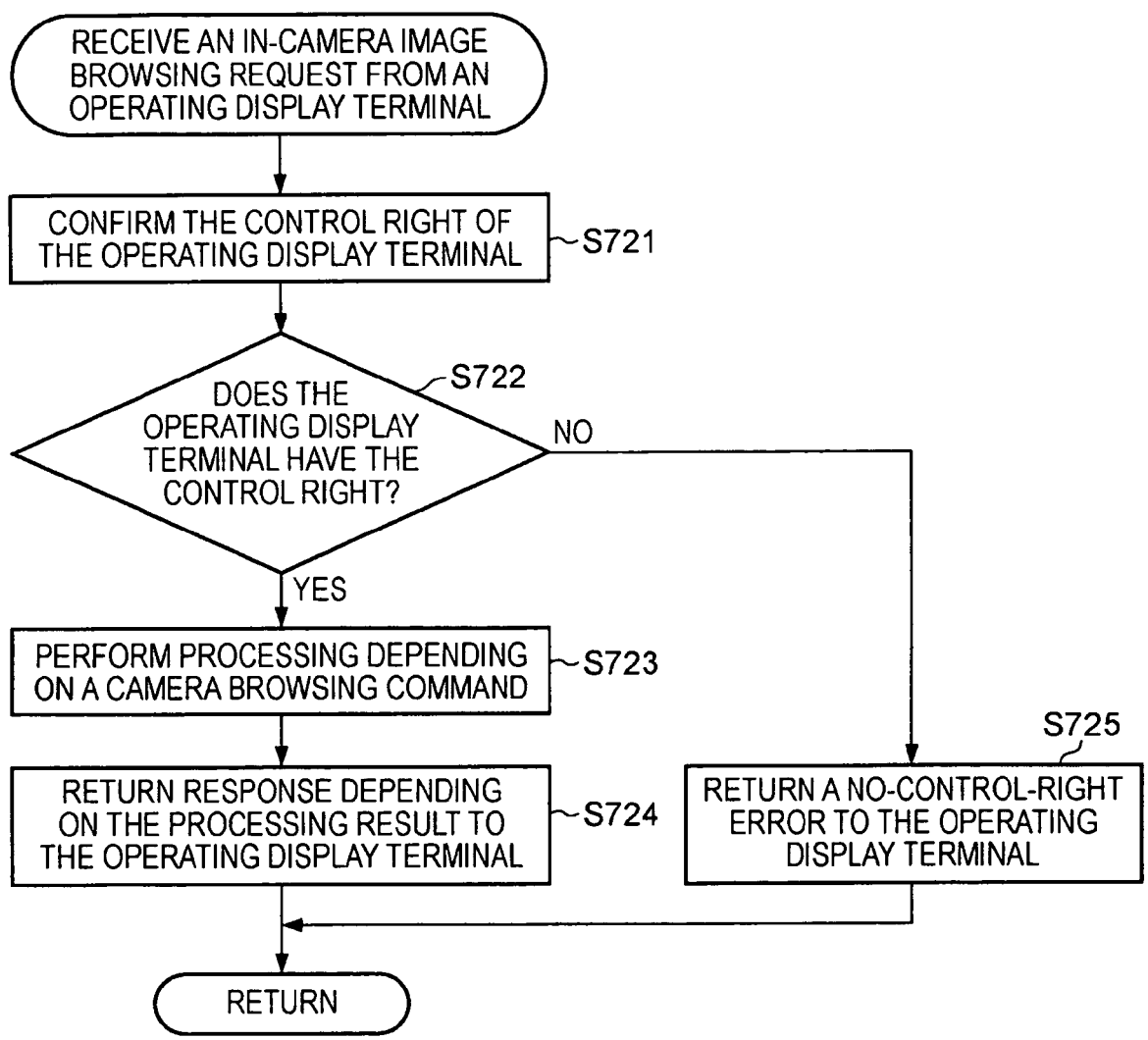
FIG. 13 illustrates an exemplary embodiment of the present invention, and is a flowchart for describing one example of the operation of the cradle device in the case of receiving a camera browsing command.

FIG. 13 is a flowchart for describing one example of the operation of the cradle device 200 in the case of receiving the above (3) camera browsing command.

In FIG. 13, the cradle device 200 receives one of the camera browsing commands C301 through C304 for browsing the images stored in the image storing unit 103 within the digital camera 100. In this case, the cradle control unit 205, as with the camera control commands, allows the operating display terminal which requested execution of the command to execute the command only in the case of the operating display terminal, which requested execution of the command, possessing the control right (step S721 through S723). The types of the camera browsing commands are as the above-described commands C301 through C304, the detailed description of operation based on the commands C301 through C304 will be omitted. Also, the cradle control unit 205 returns a response regarding the result of the command processing (success or error) to the operating display terminal which issued the command (step S724). Also, in the event of the operating display terminal serving as the originator of one of the commands C211 through C218 possessing no control right, the cradle control unit 205 returns an error signal to the operating display terminal serving as the originator of one of the commands C211 through C218 (step S725).

Figure 14:
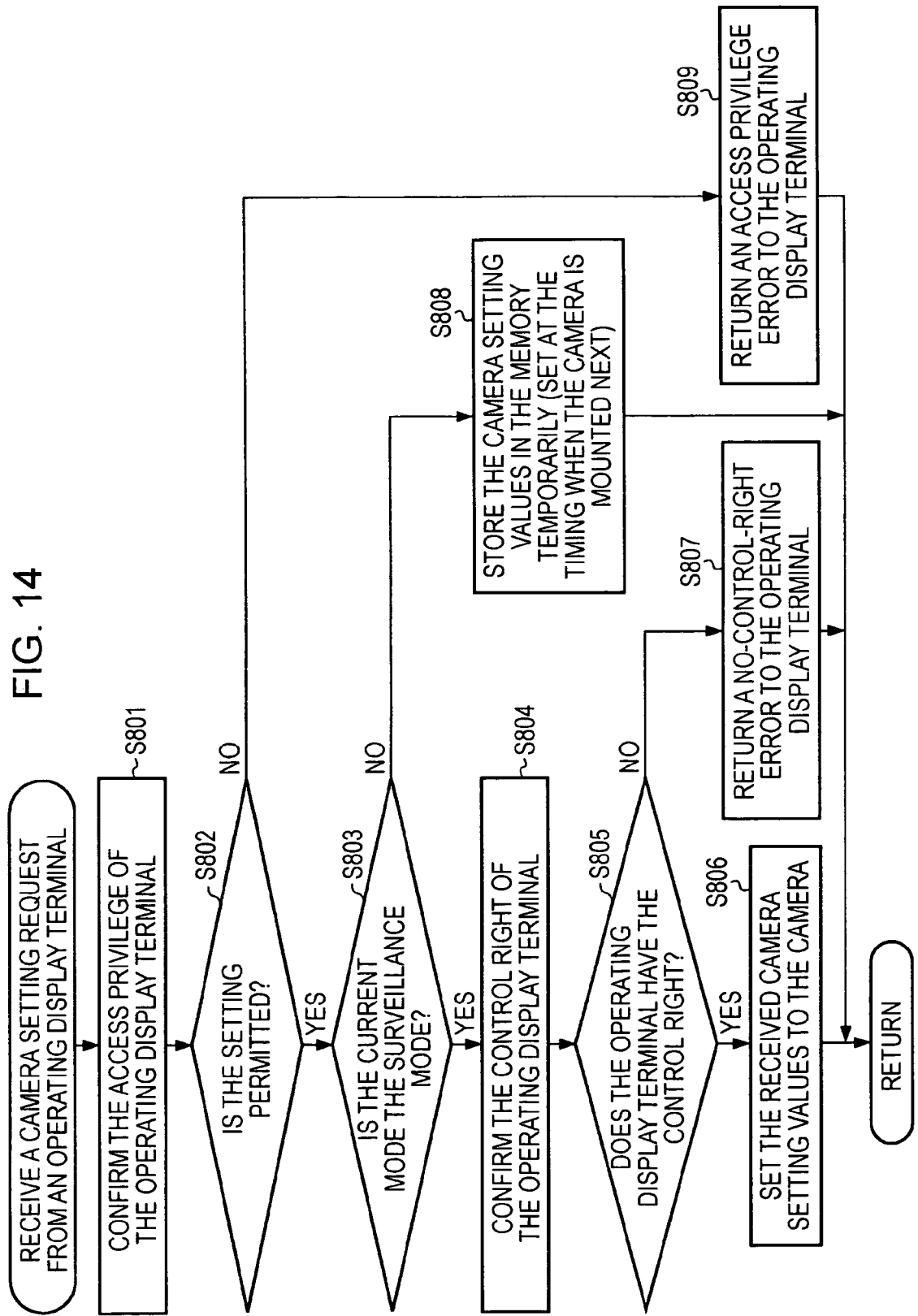
FIG. 14 illustrates an exemplary embodiment of the present invention, and is a flowchart for describing one example of the operation of the cradle device in the case of receiving a camera setting command.

Next, the operation processing of the cradle device 200 in the case of receiving the above (4) camera setting command will be described with reference to the flowchart in FIG. 14.

The cradle device 200 receives a camera setting command, i.e., one of the above-described commands C401 through C405. Then, the cradle control unit 205 confirms whether or not the operating display terminal serving as the originator of one of the commands C401 through C405 has the access privilege (step S801). In step S802, in the event of determining that the operating display terminal serving as the originator of one of the commands C401 through C405 has no access privilege, the cradle control unit 205 returns an error signal indicating no access privilege to the operating display terminal serving as the originator of one of the commands C401 through C405 (step S809).

On the other hand, in the event of determining that the operating display terminal serving as the originator of one of the commands C401 through C405 has the access privilege in step S802, the cradle control unit 205 determines whether or not the current mode of the cradle device 200 is the surveillance mode (step S803). Thus in the event of determining that the current mode of the cradle device 200 is the surveillance mode, this means that the digital camera 100 is mounted on the cradle device 200 (cradle camera-platform unit 220).

Next, the cradle control unit 205 confirms the control right of the operating display terminal serving as the originator of one of the commands C401 through C405 for controlling the digital camera 100 (step S804). In step S805, in the event of determining that the operating display terminal serving as the originator of one of the commands C401 through C405 possessing the control right, the cradle control unit 205 immediately sets the setting value in the camera setting command to the digital camera 100 (step S806). On the other hand, in step S805, in the event of determining that the operating display terminal serving as the originator of one of the commands C401 through C405 possessing no control right, the cradle control unit 205 returns an error signal to the operating display terminal serving as the originator of one of the commands C401 through C405. Thus, the cradle control unit informs the operating display terminal that it is necessary to obtain the control right (step S807).

In the above step S803, in the event of determining that the current mode of the cradle device 200 is not the surveillance mode, i.e., in the event that the digital camera 100 is not mounted on the cradle device 200 (cradle camera-platform unit 220), the cradle control unit 205 proceeds to the processing in step S808. Subsequently, the cradle control unit 205 can store the setting value of the camera setting command in the data temporary-storage unit 209 of the cradle device 200 (step S808). The setting value stored in the data temporary-storage unit 209 is read and set to the digital camera 100 in the processing in step S404 of the surveillance-mode initialization processing when the digital camera 100 is mounted on the cradle device 200. Note that the content of the camera setting command is as with the above commands C401 through C405, detailed description thereof will be omitted. The cradle device 200 has some buttons to set the setting value of the camera setting command.

Figure 15:
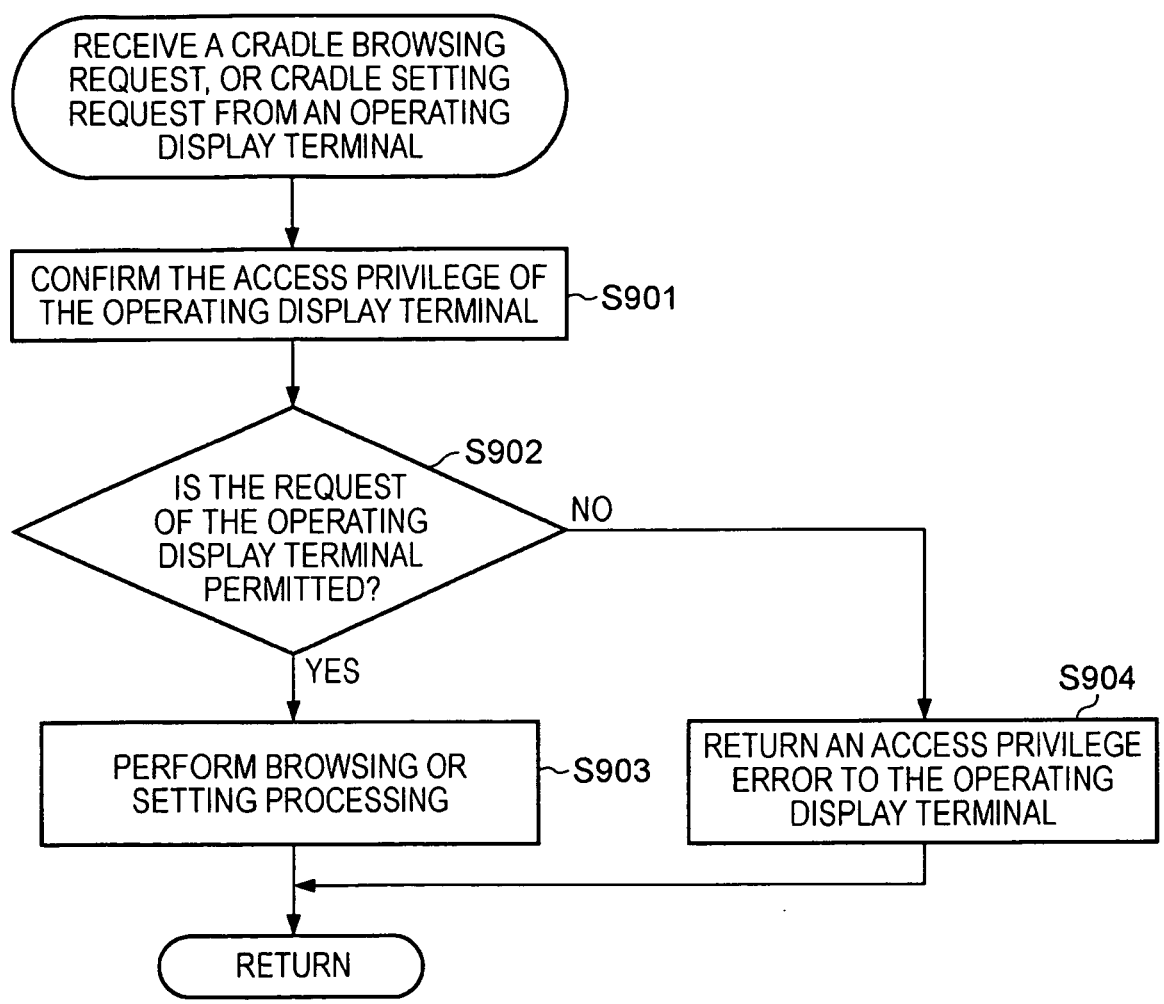
FIG. 15 illustrates an exemplary embodiment of the present invention, and is a flowchart for describing one example of the operation of the cradle device in the case of receiving a cradle browsing command or cradle setting command.

Next, the operation processing of the cradle device 200 in the case of receiving the above (5) cradle browsing command or (6) cradle setting command will be described with reference to the flowchart in FIG. 15.

The cradle device 200 receives a cradle browsing command (any one of the commands C501 through C503) or cradle setting command (any one of the commands C601 through C609). Then, the cradle control unit 205 confirms the access privilege of the operating display terminal which is an originator of any one of the commands C501 through C503, or C601 through C609 (step S901). Subsequently, the cradle control unit 205 determines whether or not the operating display terminal which is an originator of any one of the commands C501 through C503, or C601 through C609 has the access privilege (step S902).

Thus in the event that the operating display terminal has the access privilege and its request is facilitated, the cradle control unit 205 executes the processing depending on the received command (step S903). On the other hand, the cradle control unit 205 returns an error signal to the operating display terminal which is an originator of any one of the commands C501 through C503, or C601 through C609, in the event the operating display terminal has no access privilege (step S904). Note that the contents of the cradle browsing commands and the cradle setting commands are the same as the above commands C501 through C503, and C601 through C609, detailed description regarding the operation based on the commands C501 through C503, and C601 through C609 will be omitted.

Note that the operation based on these two types of commands is operation which can be processed within the cradle device 200. Accordingly, the requests from the multiple operating display terminals 301 and 302 can be processed contemporaneously. Such processing can be realized with the processing, which can have the same arrangement as a normal multitask OS (Operating System).

Incidentally, the access privilege can be set for each category of the commands. That is to say, a different access privilege can be set for each of the start of a session, camera control, camera browsing, camera setting, cradle browsing, and cradle setting. The owner of the digital camera 100 can perform camera setting and cradle setting. As for the setting method of an access privilege, various types of restriction methods such as the address list, and the range of the addresses are available.

Figure 17:
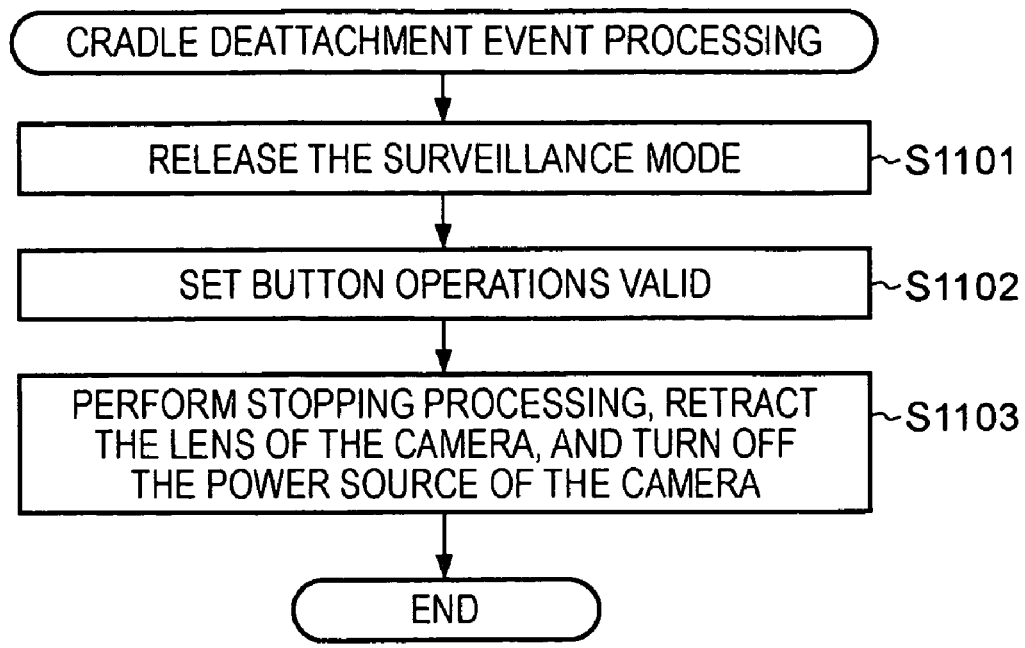
FIG. 17 illustrates an exemplary embodiment of the present invention, and is a flowchart for describing one example of the operation of the digital camera when detaching the digital camera from the cradle device.

As described above, the digital camera 100 is subjected to camera control (excluding control of the cradle camera-platform unit 220), camera browsing, and the control corresponding to camera setting via the USB. The characteristic operational processing of the digital camera 100 when the digital camera 100 is detached from the cradle device 200 (cradle camera-platform unit 220) will be described with reference to the flowchart in FIG. 17.

Upon the digital camera 100 being detached from the cradle device 200, the camera control unit 107 of the digital camera 100 detects the detachment thereof by detecting mounting/detaching of the USB connector and releases the surveillance mode (step S1101). Subsequently, the camera control unit 107 enables the disabled buttons of the digital camera 100 (step S1102), retracts the lens of the digital camera 100, and turns off the power source (step S1103).

Figure 18:
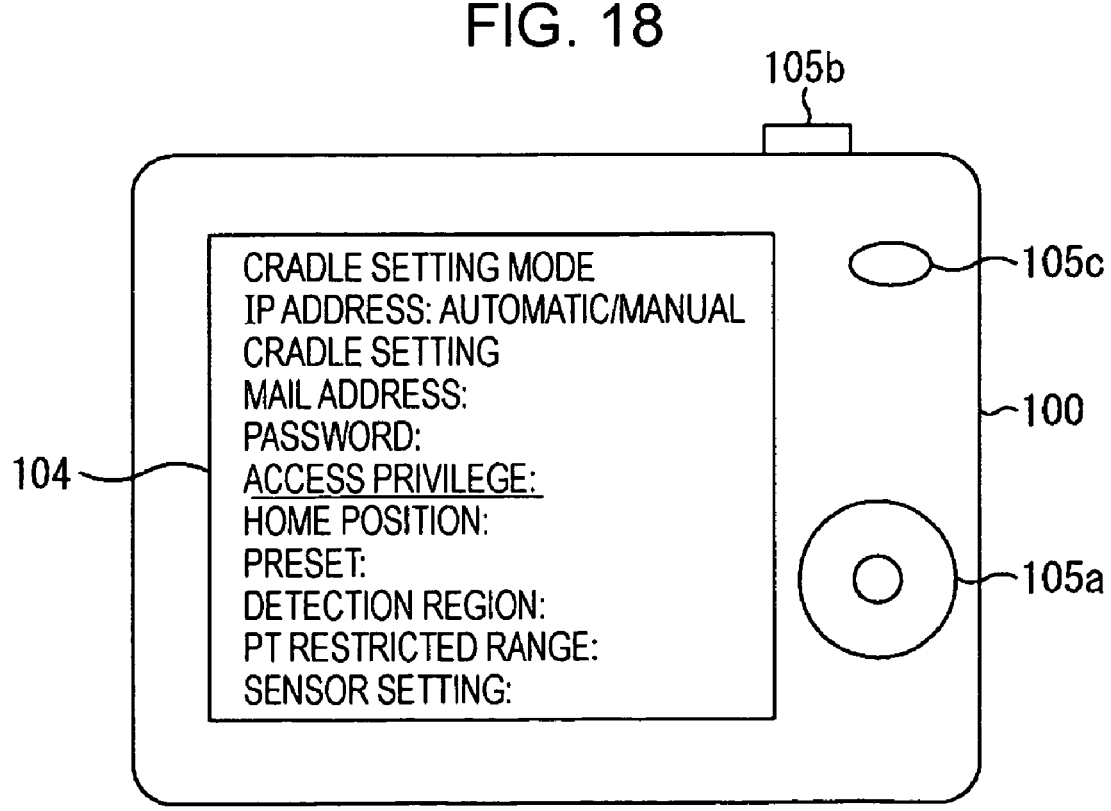
FIG. 18 illustrates an exemplary embodiment of the present invention, and is a diagram illustrating one example of the appearance configuration on the back side of the digital camera.

Next, the method of the setting operations of the cradle device 200 using the digital camera 100 will be described. FIG. 18 is a diagram illustrating one example of the appearance configuration of the backside of the digital camera 100, i.e., the surface opposite to the lens surface (surface where the operating panel of the camera is disposed).

In FIG. 18, the digital camera 100 includes operating switches 105a, a release button 105b, and a power switch 105c. The setting operations of a normal camera can be performed using a viewfinder display unit (display panel) 104, and the operating switches 105a. In addition, the viewfinder display unit (display panel) 104 provides an GUI which can set the same content as the content which can be set by the cradle setting commands.

In a state where the digital camera 100 is detached from the cradle device 200, and also the power source of the digital camera 100 is on, the user instructs changeover for displaying the GUI in the cradle setting mode. Then, the GUI such as illustrated in FIG. 18 is displayed on the viewfinder display unit 104. On this GUI, the setting items as to the cradle device 200 can be arrayed so as to be selected using the operating switches 105a. Further, upon the user selecting each item in the cradle setting mode, a GUI for setting the value for each item is displayed on the viewfinder display unit 104. The user sets the value using this GUI.

For example, upon the user selecting the access privilege as an item in the cradle setting mode, the address list and the command category for permitting access are displayed as a GUI in response to detection of the selection. With the display of this GUI, the user can perform addition and editing of an address to be permitted, and selection of a command category for obtaining permission of access. Also, upon the user selecting a PT control range, a GUI for inputting or modifying the range of a pan/tilt angle is displayed, where the user can restrict the operating range of the pan/tilt.

Though the details of the GUIs will be omitted here, the GUIs can be basically any GUI in at least one exemplary embodiment the user can set and modify the same content as the content which can be set by the cradle setting commands C601 through C609. The cradle setting values set here can be employed at the time of obtaining the cradle setting data from the digital camera 100 in step S403 of the surveillance-mode initialization processing shown in FIG. 6. Note that as for the input method of the cradle setting values, a method employing the operating switches 105a or the two-dimensional code as a photographed image is available, but detailed description thereof will be omitted here. Note that in the event of inhibiting the cradle device 200 from the operation based on the cradle setting commands C601 through C609 from the operating display terminals 301 and 302, an arrangement can be made where the settings as to the cradle device 200 can be modified only from the digital camera 100. Thus, various types of setting via the network can be prevented, whereby further security can be secured. The finder 104 of the digital camera displays the cradle setting values set at the digital camera 100. Furthermore, the screen shown in FIG. 19 displays the cradle setting values at the operating display terminals 301 and 302.

Next, the processing on the operating display terminals 301 and 302 side will be described with reference to FIG. 19. FIG. 19 is a diagram illustrating one example of the screen to be displayed on the display device of the operating display terminals 301 and 302. The example shown in FIG. 19 assumes a GUI to be realized by using a mouse or keyboard like a PC (Personal Computer). The operating display terminals 301 and 302 basically issue a command such as described above to the cradle device 200 to operate the cradle device 200 or the digital camera 100.

On the screen shown in FIG. 19, a viewfinder image display unit 191, a camera operating panel 192, an image display unit 193, and an image browsing panel 194 are disposed. On the viewfinder image display unit 191 the viewfinder image from the digital camera 100 is displayed. On the camera operating panel 192, a control right obtaining button 192a, an operating termination button 192b, a release button 192c, a release half-pressed ON/OFF toggle switch 192d, a zoom scroller 192e, and a pan/tilt control button 192f are displayed.

On the image display unit 193, the image, which can have a high resolution obtained from the digital camera 100, can be displayed. The image browsing panel 194 browses an image within the digital camera 100 or the cradle device 200 by using a thumbnail image list 194c. A toggle switch 194a is a switch to be selected at the time of browsing the image of the cradle device 200. A toggle switch 194b is a switch to be selected at the time of browsing the image of the digital camera 100.

The operating display terminals 301 and 302 specify the address of the cradle device 200 serving as the connection destination to activate a connection application software for operating the digital camera 100 or the cradle device 200 using an operating screen such as illustrated in FIG. 19. Then, connection processing as to the cradle device 200 is performed based on the above procedure. Subsequently, upon the address being authenticated, the viewfinder image of the digital camera 100 is obtained to be displayed on the viewfinder image display unit 191.

Further, upon the control right being obtained by pressing the control right button 192*a*, the user can modify the pan/tilt angle or the zoom value using the zoom scroller 192*e*, and the pan/tilt control button 192*f* while viewing the viewfinder image displayed on the image display unit 193. Subsequently, upon obtaining a suitable control value, the user presses the toggle switch 192*d* to make the release a half-pressed state to lock exposure and a focal point.

Upon pressing the release button 192*c* following the pan/tilt angle or the zoom value being modified, the user can perform photographing. The photographed image is not only temporarily stored in the digital camera 100 and the cradle device 200, but also transmitted to the operating display terminals 301 and 302 under connection. The transmitted image is displayed on the image display unit 193.

Also, in the event that the user desires to browse the image within the digital camera 100, the user selects the control right button 192*a* to obtain the control right, and in this state, selects the camera button 194*b*. Then, the user can browse the image icons within the digital camera 100 on the image browsing panel 194. Here, upon the user double-clicking an image icon, the image corresponding to the double-clicked icon is displayed in detail on the image display unit 193 as a high-resolution image.

Also, upon selecting the cradle button 194*a*, the user can browse the image icons within the cradle device 200 on the image browsing panel 194 regardless of the possessing state of the camera control right. Here, upon the user double-clicking an image icon, as with the image within the digital camera 100, the image corresponding to the double-clicked icon is displayed in detail on the image display unit 193 as a high-resolution image.

The operating display terminals 301 and 302 determines whether or not the cradle device 200 is any mode of the surveillance mode and the cradle mode based on the response from the cradle device 200 at the time of connection (steps S506 and S512 in FIG. 8). According to this determination result, the display states of the viewfinder image display unit 191 and the camera operating panel 192 change. That is to say, in the event of the surveillance mode, the GUIs of the viewfinder image display unit 191 and the camera operating panel 192 are displayed.

On the other hand, in the event of the cradle mode, the GUIs of the viewfinder image display unit 191 and the camera operating panel 192 are unnecessary. Accordingly, in this case, an arrangement is made where the GUIs of the viewfinder image display unit 191 and the camera operating panel 192 are disabled, or the GUIs themselves of the viewfinder image display unit 191 and the camera operating panel 192 are not displayed.

Also, even in the event that a transition is made such that the digital camera 100 is detached or mounted, a response will be returned from the cradle device 200 at the processing in step S410 in FIG. 6 and the processing in step S422 in FIG. 7. Accordingly, the operating display terminals 301 and 302 determine whether or not the cradle device 200 is in any mode of the cradle mode and the surveillance mode based on this response. Subsequently, the GUIs can be arranged to be changed depending on the determined result.

Next, the operational processing of the cradle device 200 in the event of a sensor event occurring in the surveillance mode will be described with reference to the flowcharts in FIGS. 20 and 21. FIG. 20 is a flowchart for describing the operating processing regarding the operation of the cradle device 200 in the case of a sensor event occurring by operation of the sensor 211 in the event of the mode for detecting an action being set.

In FIG. 20, upon a sensor event occurring, the cradle control unit 205 confirms the locking state of the digital camera 100 as to the cradle device 200, and then locks the digital camera 100 in the cradle device 200 (step S1401).

Next, the cradle control unit 205 instructs to turn on the power source of the digital camera 100 from the resting mode (step S1402). Further, the cradle control unit 205 executes motion detection processing (step S1403). The motion detection processing mentioned here means, for example, so-called inter-frame difference processing configured to obtain a viewfinder image and calculate the differences between the previous image frame and the current image frame, which is processing for detecting presence of an action.

Next, of multiple distance measuring points for automatic focusing of the digital camera 100, the cradle control unit 205 instructs the digital camera 100 to set an appropriate distance measuring point depending on the position where an action is detected (step S1404). Next, the cradle control unit 205 controls the release of the digital camera 100 to perform photographing of high resolution. The photographed images are accumulated in the image storing unit 207 of the cradle device 200 or the image storing unit 103 of the digital camera 100 (step S1405). The cradle control unit 205 repeats steps S1404 and S1405 until any action cannot be detected for a certain period (step S1406). The cradle control unit 205 ends motion detection processing in the event that any action cannot be detected for a certain period (step S1407). Next, the cradle control unit 205 instructs to set the digital camera 100 to the resting mode (step S1408), following which releases locking of the digital camera 100 as to the cradle device 200 (step S1409), and ends the sensor event processing. Note that this sensor event processing is not restricted to the action detecting algorithm shown in FIG. 20, so can be any processing as long as an action can be detected from images.

FIG. 21 is an operational processing flowchart describing one example of operation of the cradle device 200 in the case of a sensor event occurring by operation of the sensor 211 in the event of the mode for tracking an object being set.

In FIG. 21, upon a sensor event occurring, the cradle control unit 205 confirms the locking state of the digital camera 100 as to the cradle device 200, and then locks the digital camera 100 in the cradle device 200 (step S1421).

Next, the cradle control unit 205 instructs to turn on the power source of the digital camera 100 from the resting mode (step S1422). Further, the cradle control unit 205 prepares for starting tracking processing (step S1423). The tracking processing mentioned here means, for example, processing for tracking an object using the digital camera 100 in accordance with the pan/tilt operation of the cradle camera-platform unit 220.

Next, the cradle control unit 205 temporarily stops the pan/tilt operation to prevent or reduce blurring caused at photographing until still image photographing of high resolution ends (step S1424). Next, the cradle control unit 205 instructs photographing of high resolution. Subsequently, the photographed images are accumulated in the image storing unit 207 of the cradle device 200 or the image storing unit 103 of the digital camera 100 (step S1425).

Subsequently, for example, the cradle control unit 205 instructs the camera-platform control unit 204 to control the pan/tilt operation based on the action of an object, thereby driving the pan/tilt driving unit 201 to perform the tracking processing of the object (step S1426). Tracking of the object can be performed such that the point where the action was detected is the center, or can be performed such that the object detected from images is the center, based on the motion detection processing in step S1403 in FIG. 20, for example. Note that the above motion detection processing and the tracking processing are both performed within the cradle device 200 using the viewfinder images of the digital camera 100.

Subsequently, the cradle control unit 205 repeats steps S1424 through S1426 until no action can be detected for a certain period (step S1427). The cradle control unit 205 ends the tracking processing in the event that an action cannot be detected for a certain period (step S1428). Next, the cradle control unit 205 instructs to set the digital camera 100 to the resting mode (step S1429), following which releases locking of the digital camera 100 as to the cradle device 200 (step S1430), and ends the sensor event processing. Note that this sensor event processing is not restricted to the tracking algorithm shown in FIG. 21, so can be any processing as long as an object can be tracked.

Incidentally, the above description has been made assuming that the control command has not been received from the operating display terminal 301 and 302, but an arrangement can be made where upon a sensor event occurring under control of the operating display terminal 301 or 302, control from the operating display terminal 301 or 302 is suspended, and a transition is made forcibly to the processing in FIGS. 20 and 21.

Also, description has been made here regarding the case in which the sensor 211 is set to the two operation modes of the motion detection mode and the target tracking mode, but the sensor 211 can be operated in either mode.

As described above, the present exemplary embodiment provides the following advantages as compared with the related art.

When the digital camera 100 is mounted on the cradle device 200, the surveillance mode can be enabled. Thus, the user can perform operations such as pan/tilt/zoom, or photographing instructions while viewing the viewfinder image displayed on the viewfinder display unit 104 of the operating display terminal 301 or 302.

On the other hand, when the digital camera 100 is not mounted on the cradle device 200, the cradle mode can be enabled. Thus, not only camera control such as photographing operation but also the pan/tile control of the cradle device 200 cannot be performed, whereby the digital camera 100 and the cradle device 200 can avoid wasting energy.

Also, an arrangement can be made where regarding whether the cradle device 200 is operating in either the surveillance mode or the cradle mode is displayed on the GUIs of the operating display terminals 301 and 302. Thus, the user can readily understand whether the cradle device 200 is operating in which mode depending on the presence of the digital camera 100 (i.e., mode and available operations).

Also, an arrangement can be made where the commands transmitted to the cradle device 200 from the operating display terminals 301 and 302 are classified into multiple categories, and access privileges are provided for each category. Thus, the situation in which anybody can operate control of the digital camera 100 can be prevented.

Further, an arrangement can be made where regarding the control items such as the camera control commands, and the camera browsing commands which the multiple operating display terminals 301 and 302 cannot control contemporaneously, control is arbitrated by providing the control right depending on control items. Thus, the commands from the multiple operating display terminals 301 and 302 are appropriately transmitted to the cradle device 200, control of the cradle device 200 and the digital camera 100 can be performed smoothly.

On the other hand, an arrangement can be made where regarding browsing of the images within the cradle device 200, the multiple operating display terminals 301 and 302 can instruct to browse the images contemporaneously, whereby ease of use can be improved.

An arrangement can be made where the digital camera 100 is mechanically locked in the cradle device 200 when controlling the digital camera 100 and when processing the event of the sensor 211. Thus, the digital camera 100 can be prevented from being detached at the timing when it is not desired to detach the digital camera 100.

Also, an arrangement can be made where when the digital camera 100 is not mounted, in the event of accepting the operation relating to setting of the digital camera 100, the data relating to the operation thereof is temporarily stored in the cradle device 200. Thus, when the digital camera 100 is mounted on the cradle device 200 next, the setting values of the digital camera 100 can be automatically updated.

An arrangement can be made where when the digital camera 100 is not mounted on the cradle device 200, the digital camera 100 can be used as a normal digital camera, and when the digital camera 100 is mounted on the cradle device 200, the settings of the digital camera 100 are automatically changed to the settings appropriate for surveillance. Thus, an image size, image quality, exposure, and focus setting can be set appropriate for communication and image blurring due to camera shake at photographing when the digital camera 100 is mounted on the cradle device 200. Accordingly, more flexible photographing conditions can be set, such that the amount of communication data can be reduced, or further low-speed shutter photographing can be performed. Also, at this time, the digital camera 100 can be prevented from being operated blindly by invalidating the buttons of the digital camera 100.

Also, an arrangement can be made where the setting items of the cradle device 200 are input using the digital camera 100, and then the settings of the cradle device 200 can be modified at the timing of mounting the digital camera 100 on the cradle device 200. Thus, the settings of the cradle device 200 can be readily modified using the digital camera 100 without employing a personal computer. Also, modification of the settings due to unauthorized access via the network can be reduced by facilitating the digital camera 100 alone to modify the settings of the cradle device 200, thereby reducing the problems relating to security.

Also, an arrangement can been made where when mounting the digital camera 100 on the cradle device 200, the resting mode for turning off the power source without retracting the lens of the digital camera 100 is provided, whereby the digital camera 100 can be activated immediately after being restored from the resting mode.

Further, an arrangement can be made where only when there is input from the sensor 211 (only when there is detection of movement), the power source of the digital camera 100 is turned on so as to perform photographing. Thus, waste of power at the digital camera 100 can be prevented or reduced, and also heating up of the digital camera 100 can be suppressed.

Also, an arrangement can be made where the tracking processing and the motion detection processing, which are not suitable for realization within the digital camera 100, are performed at the cradle device 200, whereby increased cost and weight of the digital camera 100 can be prevented or reduced.

Figure 22:
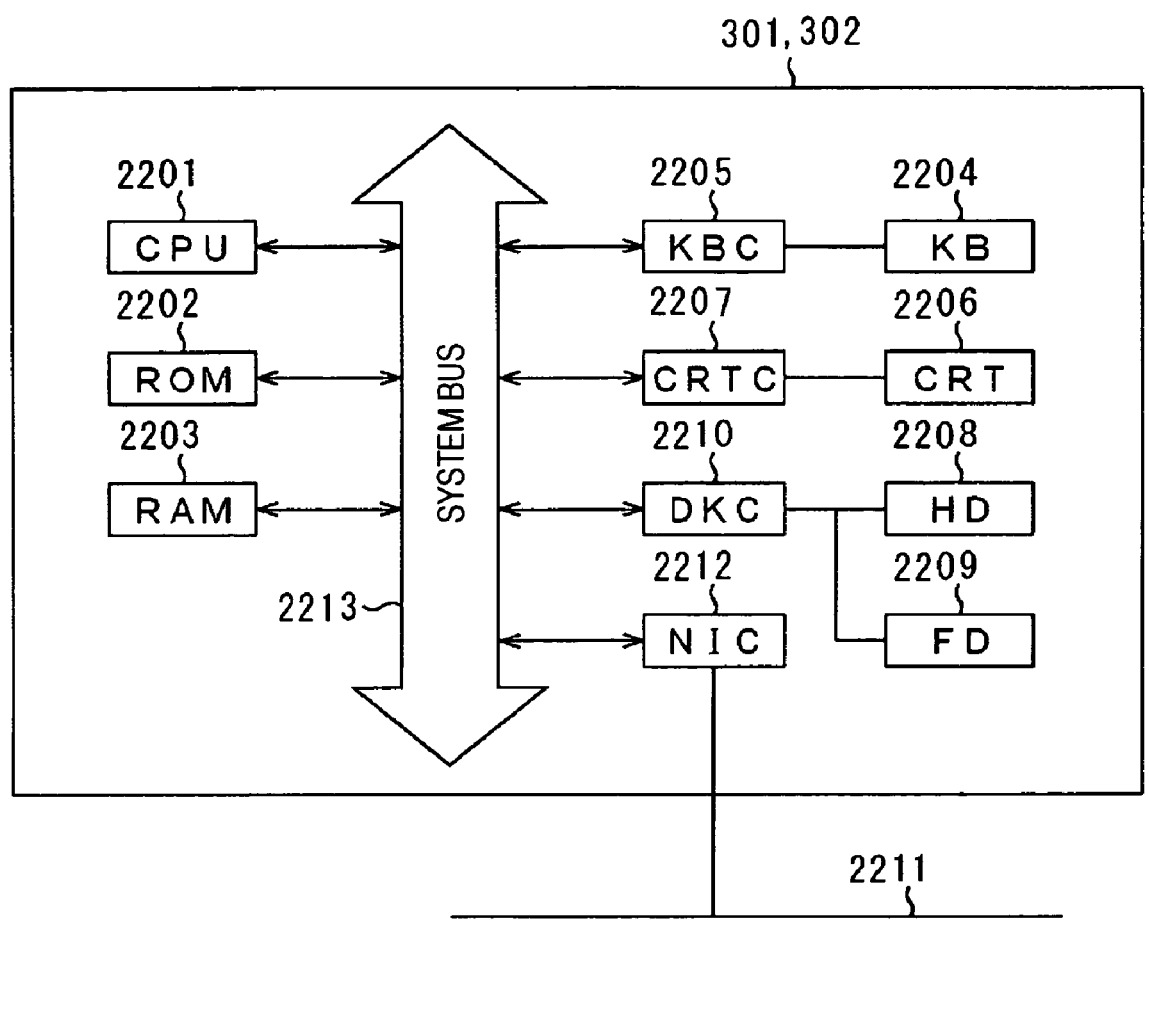
FIG. 22 illustrates an exemplary embodiment of the present invention, and is a block diagram illustrating one example of the configuration of the operating display terminal.

Note that the hardware configuration of the above operating display terminals 301 and 302 is such as illustrated in FIG. 22, for example.

In FIG. 22, the operating display terminals 301 and 302 are configured where a CPU 2201, ROM 2202, RAM 2203, a keyboard controller (KBC) 2205 of a keyboard (KB) 2204, a CRT controller (CRTC) 2207 of a CRT display (CRT) 2206 serving as a display unit, a disk controller (DKC) 2210 of a hard disk (HD) 2208 and a flexible disk (FD) 2209, a network interface controller (NIC) 2212 for connecting to a network 2211 are connected via a system bus 2213 so as to communicate with each other.

The CPU 2201 centrally controls each component connected to the system bus 2213 by executing the software stored in the ROM 2202 or HD 2208, or the software to be supplied from the FD 2209.

That is to say, the CPU 2201 performs control for realizing later-described operation by reading out the processing program in accordance with a predetermined processing sequence from the ROM 2202, HD 2208, or FD 2209, and executing this.

The RAM 2203 serves as the main memory or work area of the CPU 2201. The KBC 2205 controls instructions input from the KB 2204 or an unshown pointing device. The CRTC 2207 controls display of the CRT 2206. The DKC 2210 controls access to the HD 2208 and FD 2209 which store a boot program, various types of applications, an editing file, a user file, a network management program, and a predetermined processing program according to the present exemplary embodiment. The NIC 2212 exchanges data with a device or system over the network 2211 in a bidirectional manner.

Modifications

An arrangement where the program code of software for realizing the functions of the above embodiment is supplied to a computer within a device or system connected to various types of devices so as to operate various types of devices to realize the functions of the above embodiment, and the functions of the above embodiment are implemented by operating the above various types of devices in accordance with the program stored in the computer (CPU or MPU) of the system or device, is also encompassed in the scope of the present invention.

Also, in this case, the program code itself of the above software realizes the functions of the above embodiment, and the program code itself and device configured for supplying the program code to the computer, for example, a recording medium storing such a program code makes up the present invention. As for a recording medium storing such a program code, a flexible disk, a hard disk, an optical disc, an magneto-optical disc, CD-ROM, a magnetic tape, a nonvolatile memory card, ROM, or other related or equivalent recording apparatus and/or methods as known by one of ordinary skill in the relevant art can be employed, for example.

Also, it is needless to say that in cases in which the functions of the above exemplary embodiment are realized by the computer executing the program code supplied, and further in cases in which the program code realizes the functions of the above exemplary embodiment in collaboration with the OS (Operating System) running on the computer, or other application software, the program code is encompassed in at least one exemplary embodiment.

Further, it is needless to say that a case in which following the supplied program code being stored in the memory included in a function expansion board of the computer or a function expansion unit connected to the computer, the CPU included in the function expansion board or function expansion unit executes part or a substantial portion of the actual processing based on the instructions of the program code, and the functions of the above embodiment are realized by the processing, is also encompassed in at least one exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-168205 filed Jun. 8, 2005, which is hereby incorporated by reference herein in its entirety.

What is claimed is:

1. A cradle device comprising:
   a mounting unit for mounting an imaging device;
   a mounting determining unit for determining whether the imaging device is mounted on the mounting unit;
   a driving device for driving at least one of pan and tilt; and
   a controller for controlling the driving device;
   wherein the controller controls the driving device to drive the at least one of pan and tilt based on an instruction from an external device in the event that the mounting determining unit determines that the imaging device is mounted on the mounting unit, and the controller inhibits the driving device from driving the at least one of pan and tilt in the event that the mounting determining unit determines that the imaging device is not mounted on the mounting unit.

2. The cradle device according to claim 1, wherein the mounting unit has a locking mechanism for mechanically locking the imaging device by the controller while an external device obtains a control right of the imaging device.

3. The cradle device according to claim 1, wherein the controller disables at least one operating switches of the imaging device, in the event that the mounting determining unit determined that the imaging device is mounted on the mounting unit.

4. The cradle device according to claim 1, wherein the controller stop a power source of the imaging device without taking in a lens of the imaging device mounted on the mounting unit at the time of stopping the power source of the imaging device.

5. The cradle device according to claim 1, further comprising an image storing device configured for storing an image captured from the imaging device mounted on the mounting unit.

6. A method of controlling an image sensing system that includes an imaging device and a cradle device, the method comprising:
   a mounting determining step for determining whether an imaging device is mounted on a mounting unit of the cradle device; and
   a control step in which a controller of the cradle device controls a driving device of the cradle device to drive at least one of pan and tilt based on an instruction from an external device in the event that determination is made in the mounting determining step that the imaging device is mounted on the mounting unit, and the cradle device inhibits the driving device of the cradle device from driving at least one of pan and tilt in the event that determination is made in the mounting determining step that the imaging device is not mounted on the mounting unit.

7. The method according to claim 6, wherein in the control step, the cradle device mechanically locks the imaging device using a locking mechanism while an external device obtains a control right of the imaging device.

8. The method according to claim 6, wherein the cradle device disables at least one operating switches of the imaging device, in the event that determination is made in the mounting determining step that the imaging device is mounted on the mounting unit.

9. The method according to claim 6, wherein the cradle device stops a power source of the imaging device without taking in a lens of the imaging device mounted on the mounting unit in the control step, in the event that determination is made in the mounting determining step that the imaging device is mounted on the mounting unit.

10. A computer readable medium that stores a program for causing a computer to execute a method of controlling an image sensing system, the method comprising:
   a mounting determining step for determining whether a mounting unit the imaging device is mounted on a mounting unit of a cradle device; and
   a control step in which a controller of the cradle device controls a driving device of the cradle device to drive at least one of pan and tilt based on an instruction from an external device in the event that determination is made in the mounting determining step that the imaging device is mounted on the mounting unit, and the cradle device inhibits the driving device of the cradle device from driving at least one of pan and tilt in the event that determination is made in the mounting determining step that the imaging device is not mounted on the mounting unit.

11. The method according to claim 10, wherein in the control step, the cradle device mechanically lock the imaging device using a locking mechanism while an external device obtains a control right of the imaging device.

12. The method according to claim 10, wherein the computer program causes the computer to execute processing for invalidating at least one operating switches of the imaging device, in the event that determination is made in the mounting determining step that the imaging device is mounted on the mounting unit.

13. The method according to claim 10, wherein the computer program causes the computer to execute processing for stopping a power source of the imaging device without taking in a lens of the imaging device mounted on the mounting unit in the control step, in the event that determination is made in the mounting determining step that the imaging device is mounted on the mounting unit.

* * * * *